(12) United States Patent
Iwamoto

(10) Patent No.: US 6,865,158 B2
(45) Date of Patent: Mar. 8, 2005

(54) ATM SWITCH WITH OAM FUNCTIONS

(75) Inventor: Hiroyuki Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 784 days.

(21) Appl. No.: 09/729,577

(22) Filed: Dec. 4, 2000

(65) Prior Publication Data

US 2001/0002909 A1 Jun. 7, 2001

(30) Foreign Application Priority Data

Dec. 3, 1999 (JP) ............................................ 11-344068

(51) Int. Cl.[7] ............................................. H04L 12/26
(52) U.S. Cl. .................... 370/248; 370/249; 370/395.1; 370/413
(58) Field of Search ................................ 370/242, 243, 370/244, 248, 249, 395.1, 395.31, 413

(56) References Cited

U.S. PATENT DOCUMENTS

| | | | | |
|---|---|---|---|---|
| 5,864,555 A | * | 1/1999 | Mathur et al. ........... | 370/236.2 |
| 5,867,481 A | * | 2/1999 | Miyagi ........................ | 370/244 |
| 5,872,770 A | * | 2/1999 | Park et al. ............... | 370/241.1 |
| 6,198,726 B1 | * | 3/2001 | Hayami et al. .......... | 370/236.2 |
| 6,445,708 B1 | * | 9/2002 | Jones ......................... | 370/397 |
| 6,661,795 B1 | * | 12/2003 | Adas et al. .............. | 370/395.1 |

FOREIGN PATENT DOCUMENTS

| | | |
|---|---|---|
| JP | 5-30128 | 2/1993 |
| JP | 8-237256 | 9/1996 |
| JP | 8-237267 | 9/1996 |
| JP | 8-331131 | 12/1996 |
| JP | 9-191312 | 7/1997 |
| JP | 10-262064 | 9/1998 |
| JP | 11-355314 | 12/1999 |

* cited by examiner

*Primary Examiner*—Chau Nguyen
*Assistant Examiner*—Christine Ng
(74) *Attorney, Agent, or Firm*—Scully, Scott, Murphy & Presser

(57) ABSTRACT

An ATM switch allowing simplified OAM processing only on the line incoming side is disclosed. An incoming line circuit has a header conversion table storing information indicating whether the system is an end point of an OAM processing flow for each connection and an OAM table storing an AIS flag and an RDI flag for each connection. As for an OAM cell found by referring to these tables to be forced to go back to its own port, an switch output port number is rewritten in the OAM function section. In addition, in the case of an AIS cell, the function type is rewritten so as to become an RDI cell. In the case of an LB cell, the LB indication is rewritten so as to become a return LB cell, and switching to its own port is conducted in the ATM switch core.

12 Claims, 17 Drawing Sheets

HEADER CONVERSION TABLE

| 73 | 74 | 75 | 76 | 77 |
|---|---|---|---|---|
| VPI / VCI | NEW VPI / VCI | SW OUTPUT PORT NO. | F4 FLOW END POINT | F5 FLOW END POINT |
| VPI / VCI | NEW VPI / VCI | SW OUTPUT PORT NO. | F4 FLOW END POINT | F5 FLOW END POINT |
| ⋮ | ⋮ | ⋮ | ⋮ | ⋮ |
| VPI / VCI | NEW VPI / VCI | SW OUTPUT PORT NO. | F4 FLOW END POINT | F5 FLOW END POINT |

OAM TABLE

| 90 | 91 | 92 | 93 | 94 | 95 |
|---|---|---|---|---|---|
| VPI/VCI | AIS | RDI | DEF | SW OUTPUT PORT NO. | NEW VPI/VCI |
| VPI/VCI | AIS | RDI | DEF | SW OUTPUT PORT NO. | NEW VPI/VCI |
| ⋮ | ⋮ | ⋮ | ⋮ | ⋮ | |
| VPI/VCI | AIS | RDI | DEF | SW OUTPUT PORT NO. | NEW VPI/VCI |

| OAM TYPE | CODE | FUNCTION TYPE | CODE |
|---|---|---|---|
| FAULT MANAGEMENT | 0001 | AIS | 0000 |
| | | RDI | 0001 |
| | | CONTINUITY CHECK | 0100 |
| | | LOOPBACK | 1000 |
| PERFORMANCE MANAGEMENT | 0010 | FORWARD MONITORING | 0000 |
| | | BACKWARD MONITORING | 0001 |
| ACTIVATION/ DEACTIVATION | 1000 | FORWARD MONITORING AND THE ASSOCIATED BACKWARD REPORTING | 0000 |
| | | CONTINUITY CHECK | 0001 |
| | | FORWARD MONITORING | 0010 |
| SYSTEM MANAGEMENT | 1111 | UNDEFINED | UNDEFINED |

PRIOR ART

PRIOR ART

ATM SWITCH WITH OAM FUNCTIONS

BACKGROUND OF THE INVENTION

1. Field of the Invention

The present invention relates to an ATM switching system, and in particular to an ATM switch system having an operation, administration, and maintenance function.

2. Description of Related Art

In data communication using the ATM (Asynchronous Transfer Mode) technique, a fixed length packet called cell is used as a transfer unit, which allows allocation of bandwidths required for communication channels for respective ones of destinations of multimedia information such as data, audio, and video. By inserting an operation, administration, and maintenance (OAM) cell on the communication channel, OAM processing such as fault notification and connection tests can be conducted on the communication channel. The OAM processing makes optimum data communication such as reconnection and alternate connection of communication channels possible depending on the situation of the data network.

As for such OAM processing, an OAM performance management function and an OAM fault management function in an ATM layer for processing a 53-byte cell are prescribed in Recommendation I.610 "B-ISDN OPERATION AND MAINTENANCE PRINCIPLES AND FUNCTIONS", International Telecommunication Union (hereafter abbreviated to ITU-T).

According to the ITU-T recommendation I.610, the OAM processing functions include a fault management function, a performance management function, an activation/deactivation function, and a system management function. The respective processing functions are identified by codes of OAM types in a predetermined OAM cell format (see FIG. 20).

The fault management determines, when there occurs a failure, notifying other elements of the connection regarding the failure and providing the means to conduct a connection test. By providing the means to make reconnection or alternate connection on the basis of a result of processing conducted by the fault management function, reliability of data communication at the time of fault occurrence is improved. The performance management uses performance management cells inserted between user cells to measure an error rate, a loss of cell, and delay characteristics in the measured section. On the basis of a result of processing conducted by the performance management function, a network status can be periodically grasped to take best measures. The activation/deactivation function is used to detect a data communication activation condition and a data communication deactivation condition in the measured section.

Among them, the fault management function is prescribed as follows: "Alarm Indication Signal" (hereafter abbreviated to AIS) for forward fault notification, "Remote Defect Indication" (hereafter abbreviated to RDI) for backward fault notification, "Continuity Check" (hereafter abbreviated to CC) for periodic fault detection, and "Loop Back" (hereafter abbreviated to LB) for fault detection in a measured section.

Respective cells of the OAM fault management function operate in the ATM network as shown in FIGS. 23-25.

It is now assumed in the ATM network, as shown in FIG. 23, that a connection has been established between first and second ATM terminals $30_1$ and $30_2$ via first and second ATM switches $31_1$ and $31_2$ and first and second ATM transmission devices $32_1$ and $32_2$. If in such connection a fault has occurred on an ATM transmission line directed from the first ATM transmission device $32_1$ to the second ATM transmission device $32_2$, the fault is detected by the second ATM transmission device $32_2$ located on the forward side, i.e., downstream side of the ATM transmission line. The second ATM transmission device $32_2$ generates an AIS cell in order to give notice of the occurrence of the fault. And the second ATM transmission device $32_2$ inserts the AIS cell thus generated between user cells, and sends them toward the second ATM switch $31_2$. Upon arrival of the AIS cell thus sent out at the second ATM terminal $30_2$ serving as an end point, an RDI cell is generated and sent out toward the first ATM terminal $30_1$ located at the other end of the connection. By receiving the RDI cell, the first ATM terminal $30_1$ can recognize the occurrence of the fault and the occurrence location. For example, the first ATM terminal $30_1$ establishes a new path between the first ATM terminal $30_1$ and the second ATM terminal $30_2$ so as to avoid the faulty path.

The first ATM switch $31_1$, as shown in FIG. 24, periodically generates a CC cell, inserts the CC cell between user cells, and send out them toward the second ATM switch $31_2$. Upon finding that the CC cell has not been received in a predetermined time by using a timer installed within the second ATM switch $31_2$, the second ATM switch $31_2$ judges that an abnormality has occurred in the connection between the first ATM switch $31_1$ and the second ATM switch $31_2$. In the case where the second ATM switch $31_2$ judges an abnormality to have occurred on the connection, the second ATM switch $31_2$ typically sends out an RDI cell toward the first ATM switch $31_1$ to give notice thereto to the effect. By receiving the RDI cell, the first ATM switch $31_1$ can recognize the occurrence of the fault and the occurrence location. For example, the first ATM terminal $30_1$ establishes a new path between the first ATM terminal $30_1$ and the second ATM terminal $30_2$ so as to avoid the faulty path.

If an administrator has conducted loopback establishment by defining the second ATM transmission device $32_2$ as the LB location as shown in FIG. 25, then the first ATM transmission device $32_1$ generates the LB cell and sends out the LB cell toward the second ATM transmission device $32_2$. Upon receiving the LB cell, the second ATM transmission device $32_2$ ascertains the LB location. When the LB location is itself, the second ATM transmission device $32_2$ returns the LB cell toward the first ATM transmission device $32_1$. Upon finding that the LB cell has not come back in a predetermined time by using a timer installed within the first ATM transmission device $32_1$, the first ATM transmission device $32_1$ judges that an abnormality has occurred in the connection between the first ATM switch $31_1$ and the second ATM switch $31_2$. For example, the first ATM terminal $30_1$ establishes a new path between the first ATM terminal $30_1$ and the second ATM terminal $30_2$ so as to avoid the faulty path.

An ATM switch which conducts processing using such an OAM fault management function has been disclosed in, for example, Japanese Patent Application Unexamined Publication No. 10-262064 entitled "Terminating device for a plurality of lines and OAM processing method thereof".

The conventional ATM switch includes an ATM switch core fabric having a line port section provided for each of ports thereof. The line port section includes a physical-layer terminating section and an ATM-layer terminating section. The physical-layer terminating section further includes an input physical-layer terminating section connected to incoming lines and an output physical-layer terminating section connected to outgoing lines.

As for an ATM cell inputted via one of the incoming lines, conversion from its format of the physical layer to an ATM cell having a line identifier for identifying the line through which the cell has arrived is first performed in the input physical-layer terminating section. A resultant ATM cell is inputted to the ATM-layer terminating section. In the ATM-layer terminating section, a synthetic identifier formed of the line identifier and VPI/VCI is converted to a connection identifier for internal processing having fewer bits. After usage parameter control (hereafter abbreviated to UPC) processing which performs adjustment of cell flow to set a number of flowing cells to a predetermined value, the ATM cells are subject to OAM processing in an OAM processing section.

The OAM processing section includes an internal processing connection management table for managing information required for each OAM processing in a unified way so as to correspond to each connection identifier for internal processing. By reading out corresponding connection management data for internal processing by referring to the connection identifier for internal processing of the arriving cell, corresponding OAM processing is activated and conduced. An ordinary cell, or an OAM cell which should not be subject to OAM processing at this switch because it is not specified as the end point of the OAM cell, is sent to the ATM switch core fabric.

On the other hand, a cell outputted from the ATM switch core fabric is subject to OAM processing in the OAM processing section in the same way for the purpose of transmission. Here, the generation and transfer of an OAM cell described with reference to FIGS. 20 to 22 are mainly conducted. Then, inverse conversion is performed from the connection identifier for internal connection to the synthetic identifier formed of the line identifier and VPI/VCI. In an output physical-layer terminating section, conversion to the signal format of the physical layer is conducted. A resultant cell is sent out to an outgoing line.

In such a conventional ATM switch, the synthetic identifier formed of the line identifier and VPI/VCI is converted to a connection identifier for internal processing. On the basis of the connection identifier for internal processing, connection management data to be subject to OAM processing is managed in a unified manner. Therefore, it becomes possible to conduct OAM processing for a plurality of lines every line efficiently.

In the above-described conventional ATM switch disclosed in the Japanese Patent Application Unexamined Publication 10-262064, however, it is necessary to provide the OAM cell receiving processing function on the line reception side and provide the OAM cell generation function on the line transmission side. In order to conduct the OAM processing on one bidirectional connection, therefore, it becomes necessary to perform setting and management on two ports by using software or the like. Thus there is a problem that the software processing becomes complicated.

In addition, other OAM processing functions in each line port as described above are implicated by an integrated circuit such as an application specific integrated circuit (hereafter abbreviated to ASIC) in many cases. In that case, it becomes necessary to pull in a large number of signal lines on the reception side and the transmission side. On the other hand, it is attempted to improve the processing speed by processing line data in parallel because of increased line speed at the ATM interface. Therefore, there is a cost problem in application of the ASIC which requires to pull in a large number of signal lines on the reception side and the transmission side.

SUMMARY OF THE INVENTION

Therefore, an object of the present invention is to provide an ATM switch allowing simplified OAM processing.

According to a first aspect of the present invention, a system including an ATM (asynchronous transfer mode) switch having a plurality of pairs of input and output ports each having different port numbers assigned thereto, wherein an ATM cell arriving at an input port is transferred to an output port depending on internal header information added to the ATM cell; an incoming line circuit connected to each of a plurality of input ports of the ATM switch: and an outgoing line circuit connected to each of a plurality of output ports of the ATM switch. The incoming line circuit includes: a cell discriminator for discriminating a first OAM (operation, administration, and maintenance) cell requiring a response among ATM cells received from a corresponding incoming line; and a cell data converter for converting the first OAM cell to a second OAM cell with internal header information indicating an output port of the ATM switch corresponding to the corresponding incoming line so that the second OAM cell is transferred to the output port corresponding to the corresponding incoming line to be sent through a corresponding outgoing line circuit.

Accordingly, it becomes possible to conduct OAM processing only on the incoming or reception side. It is only necessary to pull in only signal lines of the reception side into the ASIC or the like. Therefore, it becomes possible to reduce the cost of the ASIC and the ATM switching system.

The incoming line circuit may further includes: a header conversion table including an output port number and connection information for each of possible connections identified by header information of incoming ATM cells and further containing endpoint information indicating whether the system is an endpoint of an OAM flow for each level in ATM layer for each of the possible connections; and a header converter for converting an incoming ATM cell by searching the header conversion table for an output port number and connection information according to header information of the incoming ATM cell to add the output port number and connection information to the header information of the incoming ATM cell. The cell discriminator discriminates an AIS (Alarm Indication Signal) cell having a connection relative to endpoint information indicating that the system is an endpoint of an OAM flow for each level in ATM layer and further discriminates a loopback cell when the system is set to a loopback point. The cell data converter converts the AIS cell to an RDI (Remote Defect Indication) cell and further converts the loopback cell to a return loopback cell.

Therefore, even in the case where OAM processing of one bidirectional connection is to be conducted, processing in each OAM flow can be executed only on the incoming side. Accordingly, the burden on a processor running software can be greatly reduced. In addition, it is necessary only to rewrite some fields and return a cell as it is via the ATM switch. Therefore, it is not necessary to wait vacancy of user cells unlike the conventional technique. It is thus possible to greatly reduce the waiting time of an OAM cell to be generated and sent out, and increase the speed of the OAM processing.

The cell discriminator may further discriminate an RDI cell having a connection relative to endpoint information indicating that the system is an endpoint of an OAM flow for each level in ATM layer, a CC (Continuity Check) cell, and a return loopback cell that is a response to a loopback cell transmitted by the system, wherein the system may further includes a terminator for terminating the RDI cell, the CC cell and the return loopback cell that are discriminated by the cell discriminator.

The incoming line circuit may further include: an OAM table including an AIS flag for instructing AIS cell transmission and an RDI flag for instructing RDI cell transmission, and OAM cell setting information for each of the possible connections: a flag monitor for monitoring the AIS and RDI flags of the OAM table at regular intervals to determine whether a set one among the AIS and RDI flags exists: and an OAM cell transmission controller controlling such that when an AIS flag for a connection is set, an AIS cell is produced based on the OAM cell setting information for the connection and is transferred to the ATM switch, and when an RDI flag for a connection is set, an RDI cell with an output port number associated with an input port corresponding to the incoming line circuit is produced based on the OAM cell setting information for the connection and is transferred to the ATM switch.

An ATM cell which is not discriminated by the cell discriminator is converted such that header information thereof may be changed to the connection information added by the header converter and is transferred to the ATM switch. Therefore, without greatly altering an ordinary ATM switch system, a fault management function in the OAM processing can be implemented easily.

The incoming line circuit may further include: an OAM table controller controlling such that, when an AIS cell having a connection relative to endpoint information indicating that the system is an endpoint of an OAM flow for a level of virtual path connection (VPC) has been received, an AIS flag instructing an AIS cell relative to a level of virtual channel connection (VCC) subordinate to the VPC to be transferred is set in the OAM table. Therefore, it is possible to take an optimum measure such as an alternate path or reconnection at the time of occurrence of a fault. A highly reliable ATM network can be constructed.

The incoming line circuit may further include: a first queue for queuing first cells having internal header information indicating an output port of the ATM switch corresponding to the corresponding incoming line: a second queue for queuing second cells other than the first cells; and a shaper for shaping transfer of the first cells from the first queue to the ATM switch so as to ensure communication quality of the second cells queued in the second queue. As a result, an OAM cell can be sent effectively while suppressing the influence upon the QoS of user cells to the minimum.

The incoming line circuit may further include an output controller controlling such that higher priority is given to transfer of the first cells over that of the second cells. As a result, such a situation that an OAM cell cannot be outputted due to other user cells can be avoided.

DESCRIPTION OF THE PREFERRED EMBODIMENT

Figure 1:
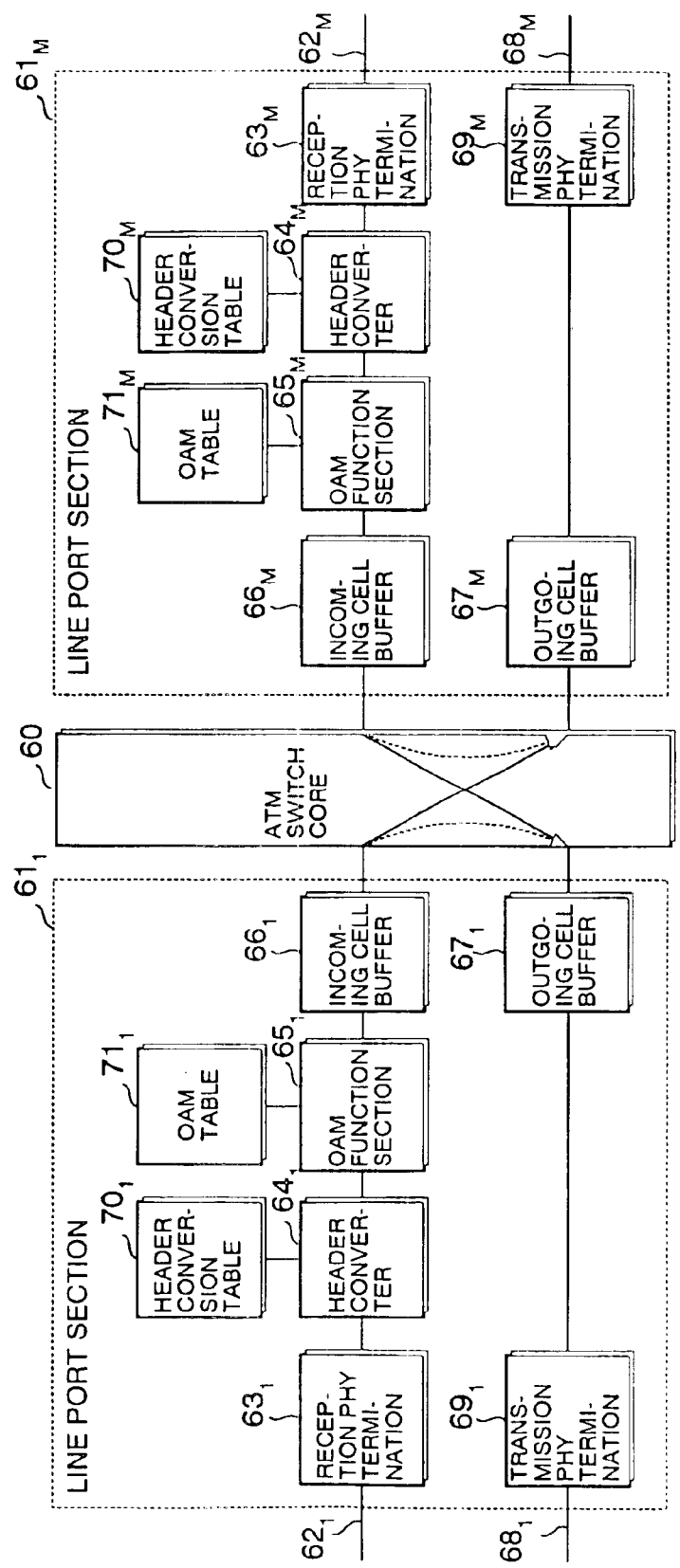
FIG. 1 is a block diagram showing an outline of a configuration of an ATM switch according to an embodiment of the present invention.

Referring to FIG. 1, an ATM switch includes an ATM switch core 60 which performs switching of ATM cells. The ATM switch core 60 has M input/output ports connected to respective ones of line port sections $61_1$-$61_M$, each of which has a pair of an incoming line and an outgoing line connected thereto. Here, for simplicity, only a first line port section $61_1$ corresponding to a first port of the ATM switch core 60 and an $M^{th}$ line port section $61_M$ corresponding to an $M^{th}$ port are shown.

Line Port Section

The first line port section $61_1$ includes an incoming line circuit and an outgoing line circuit. The incoming line circuit Includes a reception side physical layer terminating portion $63_1$ for terminating a physical layer of the reception side and receiving a cell inputted via an incoming line $62_1$, a header converter $64_1$ for converting the header of a cell terminated in the physical layer depending on the connection thereof, an OAM function section $65_1$ for conducting corresponding OAM processing in the case where the received cell is an OAM cell, and an incoming cell buffer section $66_1$ for buffering cells subjected to the OAM processing in the OAM function section $65_1$ to send them out to the ATM switch core 60.

In addition, the outgoing line circuit of the first line port section $61_1$ includes an outgoing cell buffer section $67_1$ for buffering cells received from the ATM switch core 60, and a transmission side physical layer terminating section $69_1$ for terminating a physical layer of the transmission side and transmitting cells buffered in the outgoing cell buffer section $67_1$ to an outgoing line $68_1$.

By referring to a header conversion table $70_1$ storing all connection information supported by the first line port section $61_1$, the header converter $64_1$ converts the header portion on the basis of the connection of a cell outputted from the reception side physical layer terminating section $63_1$. In this way, an outgoing port to which a cell is to be transferred by the ATM switch core 60 is determined. For all connections supported by the first line port section $61_1$, the OAM function section $65_1$ conducts generation and sending of an OAM cell by referring to an OAM table $71_1$ storing information to be subject to OAM processing.

In the ATM switch having such a configuration, the OAM processing is conducted in a hierarchical manner in order to facilitate identification of a fault or the like and recovery therefrom. In other words, the OAM processing is hierarchized into F1 to F5 levels. There are an OAM flow in a physical layer having an F1 level of a repeater section level, an F2 level of a digital section level, and an F3 level of a transmission path level, and an OAM flow in an ATM layer having an F4 level of a VP connection (hereafter abbreviated to VPC) and an F5 level of a VC connection (hereafter abbreviated to VCC). In the ATM switch in the present embodiment, OAM processing in the ATM layer is conducted in each line port section An OAM cell in an OAM flow at the F4 level is used only in the OAM flow of the F4 level. An OAM cell in an OAM flow at the F5 level is not sensed by a network element in the OAM flow of the F4 level. For example, when a fault is detected in the OAM flow of the F4 level, therefore, an AIS cell of the F4 level is transferred in the downstream direction with respect to the fault detection location. And in a network element defined as an F4 end point at the time of connection establishment, an RDI cell of the F4 level is sent out in the upstream direction in response to the AIS cell. In addition, an AIS cell of the F5 level which is higher in the hierarchy is sent out in the downstream direction. As a result, the fault management function among the OAM functions in the ATM layer is implemented. Whether a network element is an end point of the F4 level flow or the F5 level flow is set in connection information stored in the conversion table $70_1$.

Header Conversion

Figures 2, 3:
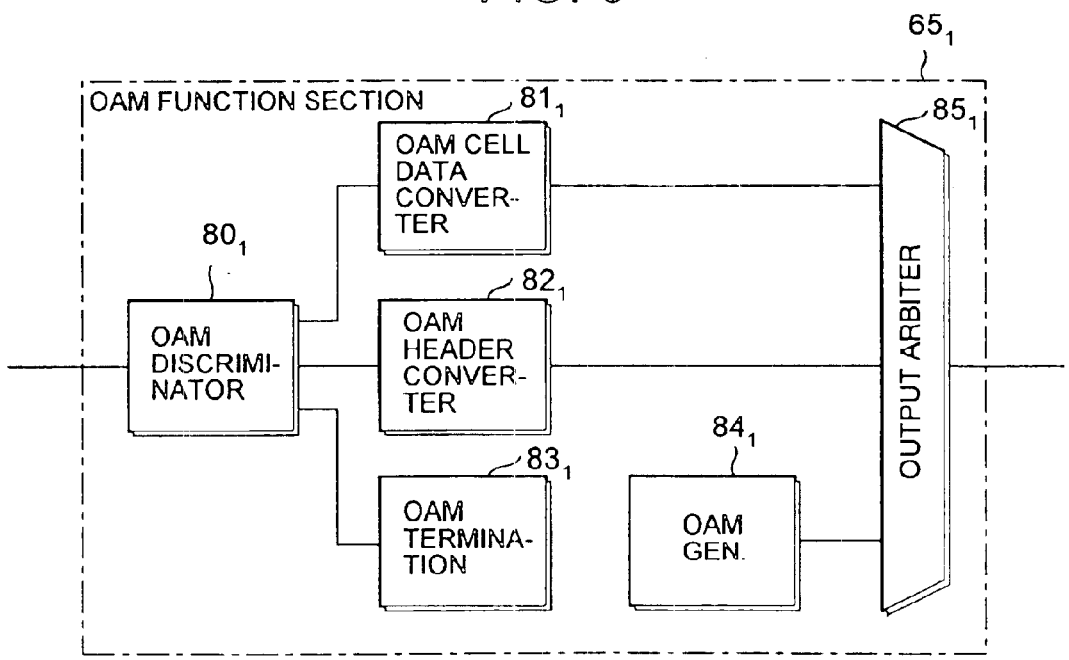
FIG. 2 is a diagram showing an outline of stored information of a header conversion table in the present embodiment.
FIG. 3 is a block diagram showing a principal part of a configuration of an OAM function section in a first line port section in the present embodiment.

FIG. 2 shows an outline of the header conversion table $70_1$. A VPI/VCI 73 indicates a connection identified by VPI and VCI set in the ATM cell header portion of an ATM cell received via a corresponding incoming line. Therefore, for each VPI/VCI 73, the header conversion table $70_1$ contains, as connection information, a new VPI/VCI 74 which is a new connection, a switch output port number 75 indicating an output port to be determined by the ATM switch core 40, an F4 flow end point 76 indicating an end point of the OAM flow of the F4 level, and an F5 flow end point 77 indicating an end point of the OAM flow of the F5 level.

With respect to a cell for which termination of the physical layer has been conducted in the reception side physical layer terminating section $63_1$, the header converter $64_1$ reads out connection information from the header conversion table $70_1$ depending on the VPI/VCI in the ATM cell header portion, adds the connection information to the ATM cell header portion, and supplies the resultant cell to the OAM function section $65_1$.

OAM Function

Referring to FIG. 3, the OAM function section $65_1$ includes an OAM discrimination section $80_1$, an OAM cell data converter $81_1$, an OAM header converter $82_1$, an OAM terminating section $83_1$, an OAM generation section $84_1$, and an output arbitration section $85_1$. The OAM discrimination section $80_1$ discriminates an input cell, and supplies the cell to one of the OAM cell data converter $81_1$, the OAM header converter $82_1$, and the OAM terminating section $83_1$. When the input cell is an AIS cell of an OAM flow of a level in the case where the present ATM switch Is an end point of an OAM flow of the level, or when the cell is an LB cell in the case where the present ATM switch is a loopback point, the OAM discrimination section $80_1$ outputs the cell to the OAM cell data converter $81_1$. When the input cell is an RDI cell of an OAM flow of a level in the case where the present ATM switch is an end point of an OAM flow of the level, when the input cell is a CC cell of an OAM flow of a level in the case where the present ATM switch is an end point of an OAM flow of the level, or when the cell is an LB cell sent out from the present ATM switch and returned by loopback at an LB point, the OAM discrimination section $80_1$ outputs the cell to the OAM terminating section $83_1$. The OAM discrimination section $80_1$ outputs other cells to the OAM header converter $82_1$.

Figures 20, 21:
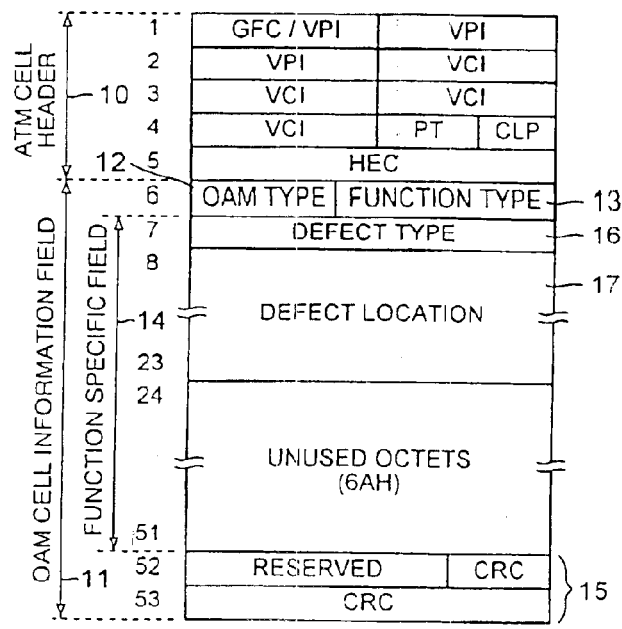
FIG. 20 is a diagram showing various functions of OAM processing prescribed in ITU-T recommendation I.610.
FIG. 21 is a diagram showing a format configuration of an AIS cell or an RDI cell.
Figure 22:
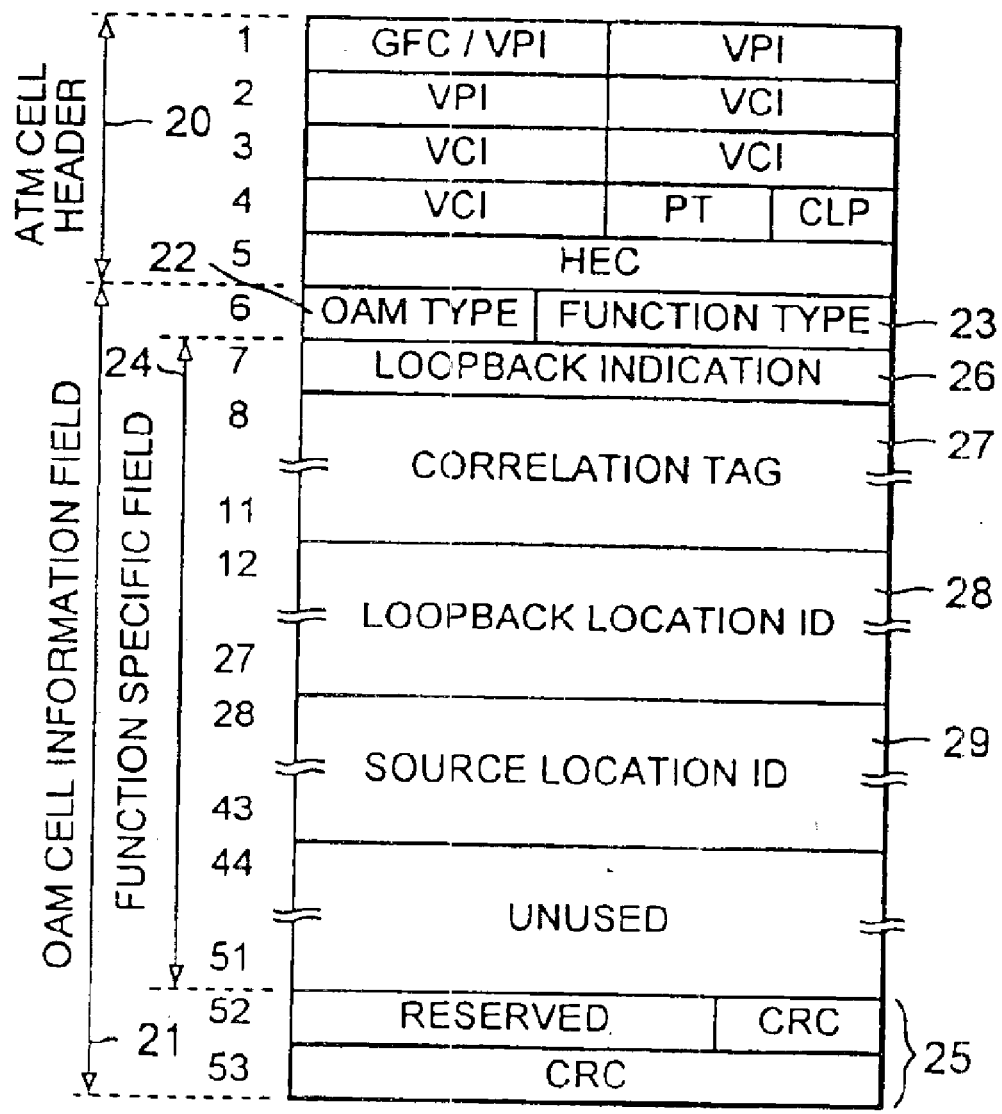
FIG. 22 is a diagram showing a format configuration of an LB cell.

The OAM cell data converter $81_1$ first rewrites the switch output port number of the cell to its own port number so as to determine its own port as a port to which the cell is to be outputted as a result of switching conducted by the ATM switch core 60. In addition, when the cell is an AIS cell, the OAM cell data converter $81_1$ rewrites the function field of the cell format as shown in FIG. 21 depending on the function type as shown in FIG. 20 so as to convert the AIS cell to a RDI cell. In the case where the cell is an LB cell, the OAM cell data converter $81_1$ rewrites the loopback indication as shown in FIG. 22 to "00000000" and converts it to a return LB cell. It should be noted that the OAM cell data converter $81_1$ does not rewrite the VPI/VCI field of the ATM cell header portion.

The OAM header converter $82_1$ rewrites the VPI/VCI field of the ATM cell so as to indicate the new VPI/VCI added in the header converter $64_1$.

The OAM terminating section $83_1$ terminates the OAM cell at the present switch.

By referring to the OAM table $71_1$, the OAM generation section $84_1$ previously generates an OAM cell to be generated for every connection at regular intervals. The OAM table $71_1$ stores an AIS flag and an RDI flag for each connection. When each flag is in the set state, the OAM generation section $84_1$ generates a corresponding OAM cell, and outputs it to the output arbitration section $85_1$.

Figures 4, 5:
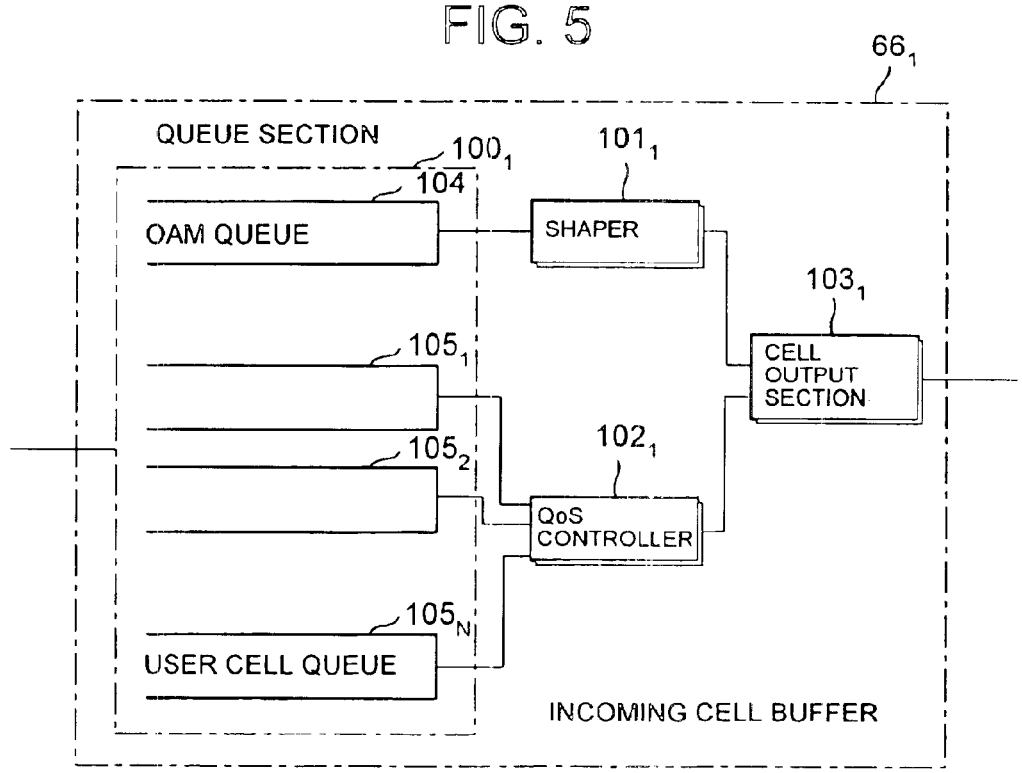
FIG. 4 is a diagram showing a form of information contained in an OAM table of the present embodiment.
FIG. 5 is a configuration diagram showing a principal part of a configuration of an incoming cell buffer in the present embodiment.

FIG. 4 shows an outline of the OAM table $71_1$. For each VPI/VCI 90 which indicates a connection determined by a pair of the VPI and VCI set in the ATM cell header portion of the input cell, the OAM table $71_1$ stores an AIS flag 91 indicating whether an AIS cell should be generated, an RDI flag 92 indicating whether an RDI cell should be generated, a DEF 93 showing a defect type set in the generated AIS cell or RDI cell, an switch output port number 94 indicating an output port to be determined by the ATM switch core 60, and a new VPI/VCI 95.

In the OAM generation section $84_1$, therefore, the AIS flag 91 and the RDI flag 92 of each connection are searched for at regular intervals. When the AIS flag 91 is in the set state, the OAM generation section $84_1$ generates an AIS cell of the format as shown in FIG. 21 having the new VPI/VCI 95 in the VPI/VCI of the cell header portion. DEF 93 in the defect type of the OAM information field, and the switch output port number 94 in the output port of the connection information added in the header converter $64_1$. When the RDI flag 92 is in the set state, the OAM generation section $84_1$ generates an RDI cell of the format as shown in FIG. 21 having the VPI/VCI of the cell header portion intact, DEF 93 in the defect type of the OAM information field, and its own port number in the output port of the connection information added in the header converter $64_1$. In addition, the OAM generation section $84_1$ is made capable of generating an LB cell at arbitrary timing under control of a management device (not illustrated).

The output arbitration section $85_1$ conducts output arbitration of ATM cells respectively outputted from the OAM cell data converter $81_1$, the OAM header converter $82_1$, and the OAM generation section $84_1$. At this time, OAM cells sent out by the OAM generation section $84_1$ are made to be outputted only when permitted not to lower the transfer efficiency.

Incoming Cell Buffer

FIG. 5 shows a configuration of the incoming cell buffer section $66_1$. The incoming cell buffer section $66_1$ includes a queue section $100_1$, a shaper section $101_1$, a QoS control section $102_1$, and a cell output section $103_1$. The queue section $100_1$ includes an OAM queue section 104 for queuing OAM cells having output port numbers which are its own port number, and first to Nth user cell queues $105_1$ to $105_N$ respectively for queuing first to Nth user cells corresponding to respective connections.

Here, OAM cells and user cells are queued for different queues. However, OAM cells and user cells may be queued for each connection. The QoS control section $102_1$ reads out user cells from respective user cell queues so as to ensure predetermined QoS of ATM cells. The shaper section $101_1$ has a shaping function for adjusting an output rate of OAM cells outputted from the OAM queue section 104 so as not to affect the output of the user cell from the QoS control section $102_1$. The cell output section $103_1$ receives output requests from the shaper section $101_1$ and the QoS section $102_1$, adjusts output cells from respective sections, and sends out user cells while giving priority to an output request from the shaper section $101_1$.

The configuration and operation of the outgoing cell buffer section $67_1$ are similar to those of the incoming cell buffer section $66_1$.

The transmission side physical layer terminating section $69_1$ converts a cell outputted from the outgoing cell buffer section $67_1$ into physical layer to send it out to the outgoing line $68_1$.

The configuration of the $M^{th}$ line port section $61_M$ is similar to that of the above-described first line port section $61_1$, and hence description thereof will be omitted. Hereafter, only the first line port section $61_1$ will be described.

The first line port section $61_1$ of the ATM switch having the above-described configuration includes a central processing unit (CPU). In accordance with a control program stored in a predetermined storage such as a read-only memory (ROM). the first line port section $61_1$ can execute various controls.

Processing of Received Cell

FIGS. 6 to 9 show the received cell processing performed by a line port section of the ATM switch according to the present embodiment.

Figure 6:
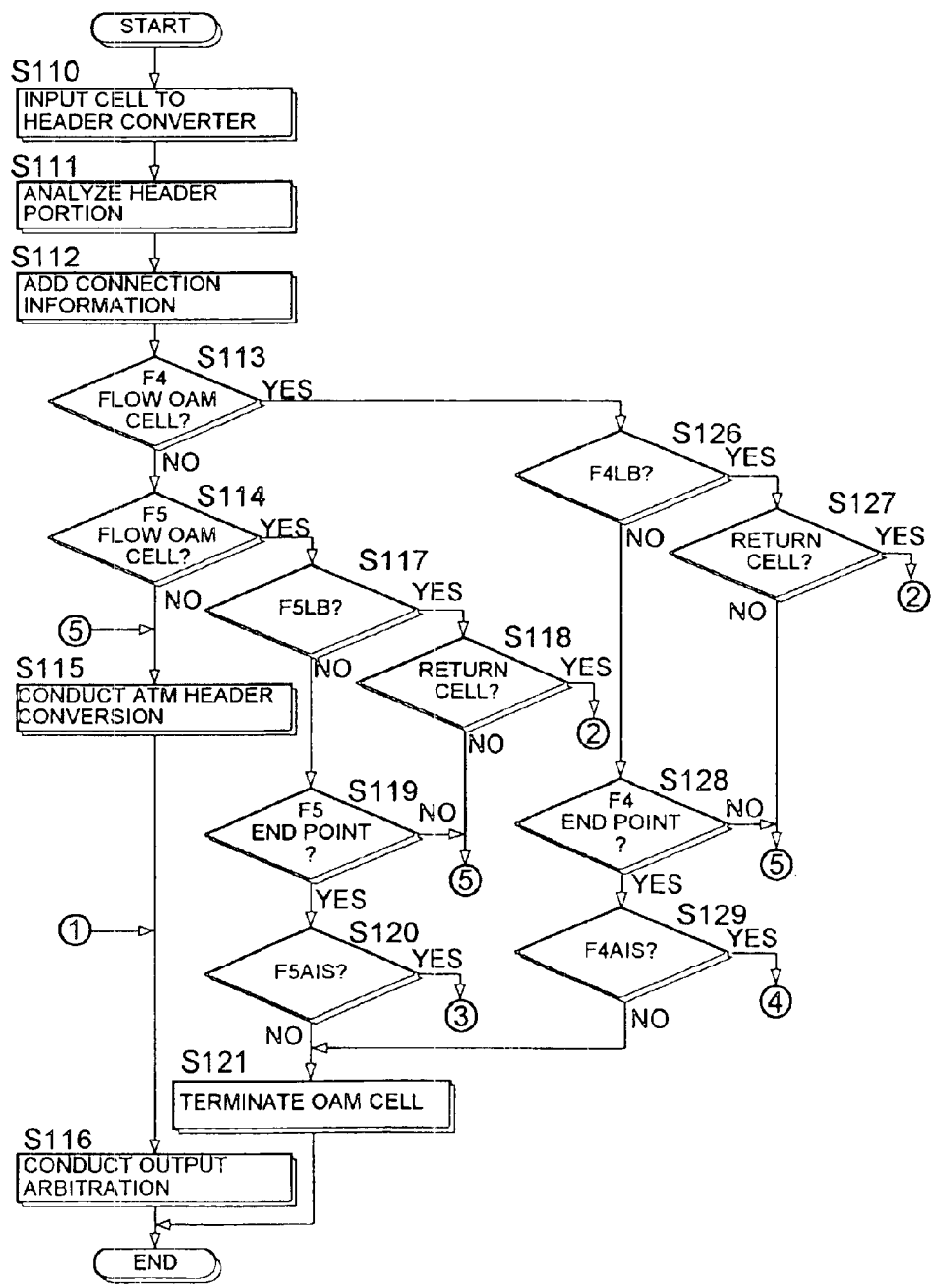
FIG. 6 is a flow chart showing received cell processing of a first line port section in the present embodiment.

Referring to FIG. 6, an ATM cell terminated by the reception side physical layer terminating section $63_1$ is inputted to the header converter $64_1$ (step S110). The header of the input ATM cell is analyzed (step S111). A new VPI/VCI and a switch output port number of the ATM switch core 60 registered in the header conversion table $70_1$ for each connection are added to the header of the input ATM cell (step S112).

Figure 10:
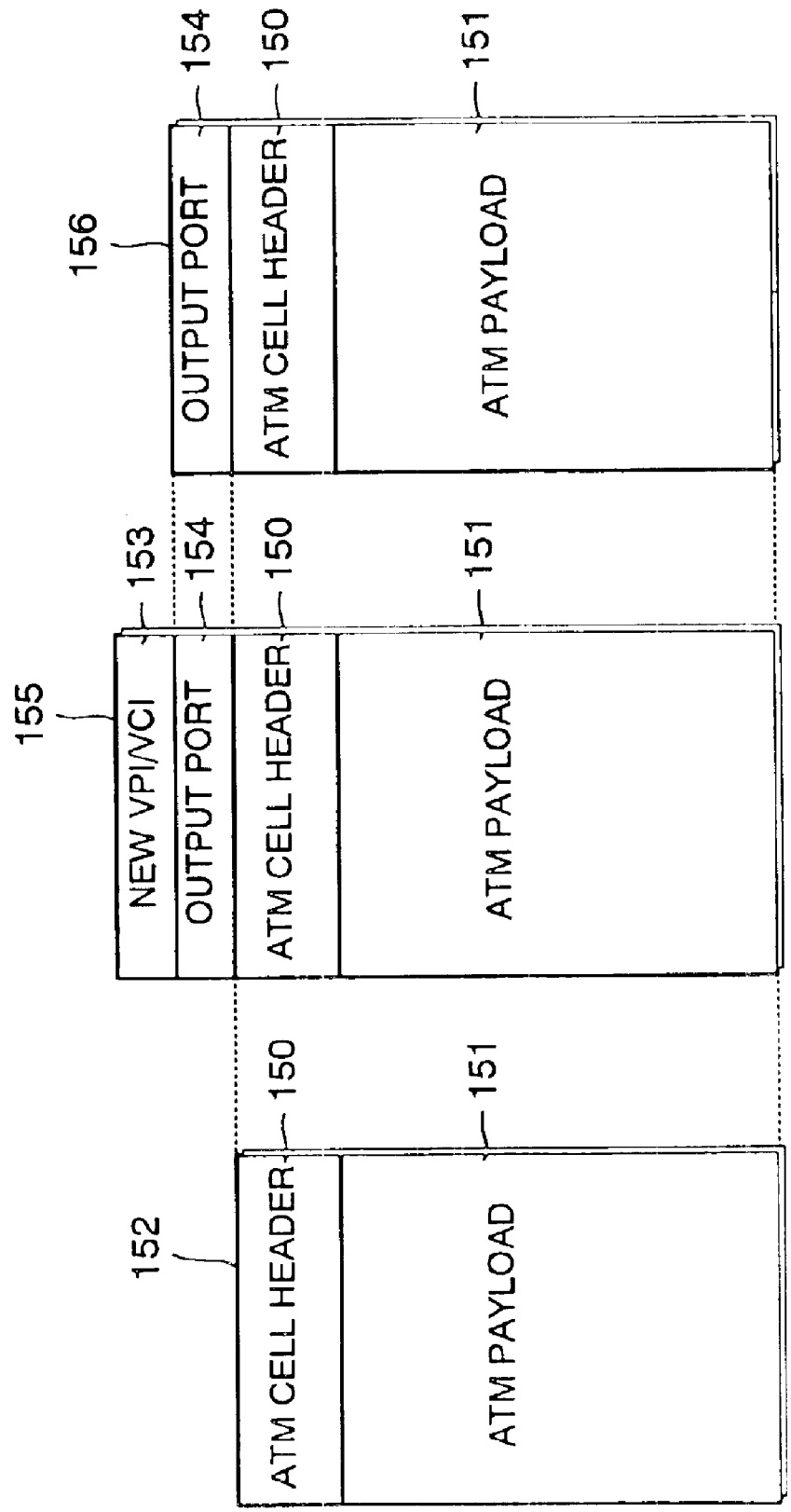
FIG. 10A is a diagram showing a format of an ATM cell terminated by a reception physical-layer terminator in the first line port section of the present embodiment.
FIG. 10B is a diagram showing a format of an ATM cell having connection information added thereto by a header converter in the first line port section of the present embodiment.
FIG. 10C is a diagram showing a format of an ATM cell outputted by an OAM function section in the first line port section of the present embodiment.

At the step S112, a new VPI/VCI 153 and an output port number 154 stored in the header conversion table $70_1$ corresponding to the connection of the ATM cell are added to the ATM cell 152 having the format including an ATM cell header 150 and an ATM payload 151 as shown in FIG. 10A. An ATM cell 155 having a new format as shown in FIG. 10B is thus generated.

The ATM cell with the connection information added at the step S112 is discriminated by the OAM discrimination section $80_1$ of the OAM function section $65_1$. It is first determined whether the cell inputted to the OAM discrimination section $80_1$ is an OAM cell of the F4 level (step S113). If the input cell is judged not to be an OAM cell of the F4 level (NO at step S113), then it is further determined whether the cell is an OAM cell of the F5 level (step S114). If the cell is judged not to be an OAM cell of the F5 level (NO at step S114), then the cell is sent to the OAM header converter $82_1$, and the VPI/VCI of the ATM cell header is changed to the new VPI/VCI (step S115). An ATM cell 156 having a format as shown in FIG. 10C is thus generated, arbitrated by the output arbitration section $85_1$, and outputted (step S116).

On the other hand, if the cell is judged at the step S114 to be an OAM cell of the F5 level (YES at step S114), then it is further determined whether the cell is an LB cell of the F5 level (step S117). If the cell is judged to be an LB cell of the F5 level (YES at step S117), then it is determined whether the cell should be returned as an LB point (step S118).

On the other hand, if the cell is judged at the step S117 not to be an LB cell of the F5 level (No at step S117), then it is further determined whether the present switch is an end point of the F5 level (step S119). The header conversion table $70_1$ registers information whether the present switch is an end point of an OAM flow of the F4 level or the F5 level or not connection by connection. By referring to the registered information, the OAM discrimination section $80_1$ can determine whether the input cell reaches an end point. If it is judged at the step S118 that the present switch is not an LB point on the basis of the LB location ID of the LB cell (NO at step S118), or if the cell is judged at the step S119 not to be an end point of the F5 level (NO at step S119), then an ATM cell of the format as shown in FIG. 10C with the new VPI/VCI dropped is generated (step S115), and output arbitration is conducted at the step S116.

If the cell is judged at the step S119 to be an end point of the F5 level (YES at step S119), then it is further determined whether the cell is an AIS cell of the F5 level (step S120). If the cell is judged not to be an AIS cell of the F5 level (NO at step S120), then the OAM cell is terminated as it is by the OAM terminating portion $83_1$ (step S121).

Figure 7:
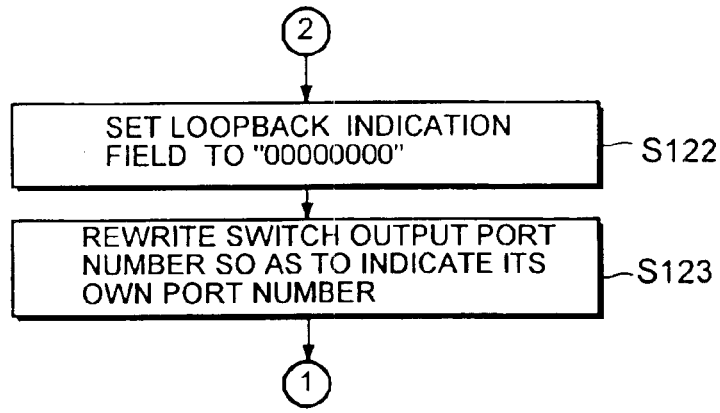
FIG. 7 is a flow chart showing reception processing of an LB cell included in the received cell processing of the first line port section in the present embodiment.

If the cell is judged at the step S118 to be an LB cell to be returned (YES at step S118), then, as shown in FIG. 7, the LB indication in the function specific field as shown in FIG. 22 is set to "00000000" which indicates the return of loopback (step S122). And the new VPI/VCI is dropped, and an ATM cell of the format as shown in FIG. 10C having an switch output port number rewritten so as to become its own port number is generated (step S123), and output arbitration is conducted at the step S116 (see FIG. 6).

Figure 8:
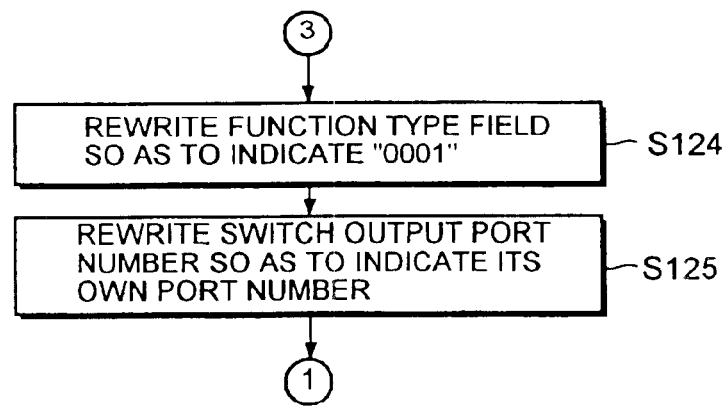
FIG. 8 is a flow chart showing reception processing of an AIS cell of F5 level included in the received cell processing of the first line port section in the present embodiment.

If the cell is judged at the step S120 to be an AIS cell of the F5 level (YES at step 120), then, as shown in FIG. 8, the indication in the function type field as shown in FIG. 21 is rewritten to become "0001" which indicates an RDI cell (step S124). And the new VPI/VCI is dropped, and an ATM cell of the format as shown in FIG. 10C with the switch output port number rewritten to become its own port number is generated (step S125). Output arbitration is conducted at the step S116.

On the other hand, if the cell is judged to be an OAM cell of the F4 level (YES at step S113), then it is determined whether the cell is an LB cell of the F4 level (step S126). If the cell is judged to be an LB cell of the F4 level (YES at step S126), then it is determined whether the cell should be returned as the LB point (step S127). On the other hand, if the cell is judged at the step S126 not to be an LB cell of the F4 level (NO at step S126), then it is determined whether the cell is an end point of the F4 level (step S128).

If it is judged at the step S127 that the present switch should not be an LB point on the basis of the LB location ID of the LB cell (NO at step S127), or if it is judged at the step S128 not to be an end point of the F4 level (NO at step S128), then an ATM cell of the format as shown in FIG. 10C with the new VPI/VCI dropped is generated (step S115), and output arbitration is conducted at the step S116.

If the cell is judged at the step S128 to be an end point of the F4 level (YES at step S128), then it is determined whether the cell is an AIS cell of the F4 level (step S129). If the cell is judged not to be an AIS cell of the F4 level (NO at step S129), then the OAM cell is terminated intact by the OAM terminating portion $83_1$ (step S121).

If the cell is judged at the step S127 to be an LB cell to be returned (YES at step S127), then the LB indication in the function specific field shown in FIG. 22 is set to "00000000" which indicates the return of loopback (step S122 in FIG. 7). And the new VPI/VCI is dropped, and an ATM cell of the format as shown in FIG. 10C having an switch output port number rewritten so as to become its own port number is generated (step S123), and output arbitration is conducted at the step S116.

Figure 9:
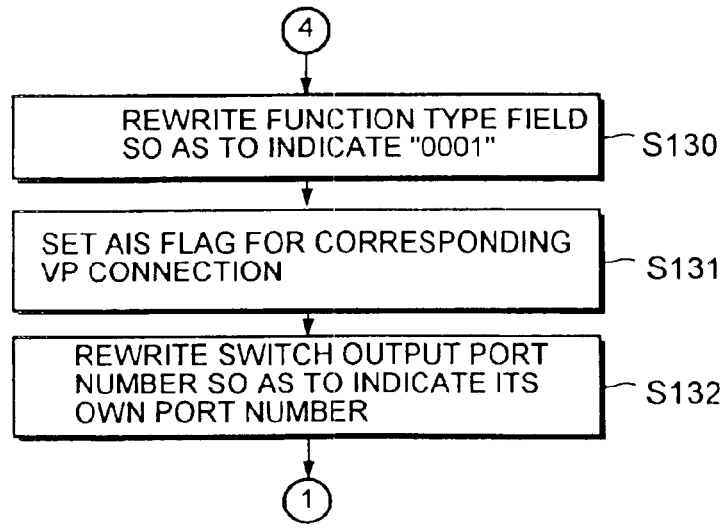
FIG. 9 is a flow chart showing reception processing of an AIS cell of F4 level included in the received cell processing of the first line port section in the present embodiment.

If the cell is judged at the step S129 to be an AIS cell of the F4 level (YES at step 129), then, as shown in FIG. 9, the indication in the function type field as shown in FIG. 21 is rewritten to become "0001" which indicates an RDI cell (step S130). In addition, in the OAM table $71_1$, AIS flag for a corresponding VP connection is set (step S131). Thereby, when an AIS of F4 level has been received, AIS of the F5 level is generated in a predetermined period from the OAM generation section $84_1$. Furthermore, the new VPI/VCI of the cell is dropped, and an ATM cell of the format as shown in FIG. 10C with the switch output port number rewritten to become its own port number is generated (step S132). Output arbitration is conducted at the step S116.

More specifically, data conversion conducted in the first line port section $61_1$ will now be described.

Figure 11:
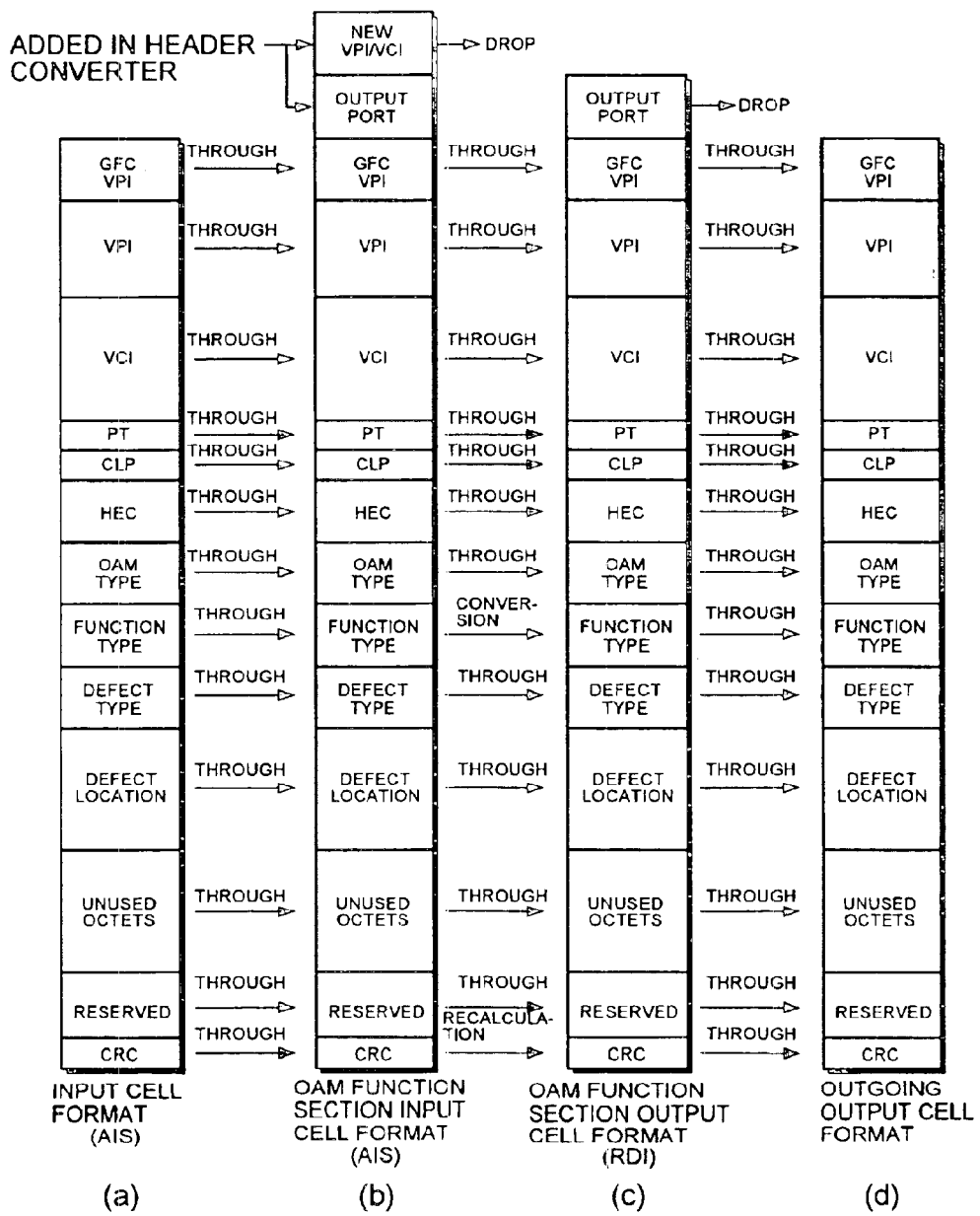
FIG. 11 is a diagram schematically showing data conversion conducted when returning an RDI cell on the basis of a received AIS cell in the present embodiment.

FIG. 11 schematically shows data conversion conducted when an RDI cell is returned in response to a received AIS cell, wherein (a) shows a format of a received AIS cell, (b) shows a format of a cell inputted to the OAM function section $65_1$, (c) shows a format of a cell outputted from the OAM function section $65_1$, and (d) shows a format of a cell sent out on an outgoing line.

In the header converter $64_1$, a new VPI/VCI corresponding to the connection and an switch output port number are added to an AIS cell having the format configuration (see FIG. 21) as shown in (b) of FIG. 11. Thereafter, in the OAM discrimination section $80_1$ of the OAM function section $65_1$, the AIS cell is outputted to the OAM cell data converter $81_1$. The OAM cell data converter $81_1$ rewrites the switch output port number added to the AIS cell into its own port number as described above, rewrites the function type so as to indicate RDI, recalculates CRC, and outputs the RDI cell with the new VPI/VCI dropped as shown in (c) of FIG. 11.

The RDI cell is queued in the incoming cell buffer section $66_1$, and then switched in the ATM switch core 60 to its own switch port which is the corresponding output switch port. At that time, there is outputted an RDI cell having such a format that the switch output port number is dropped as shown in (d) of FIG. 11.

Figure 12:
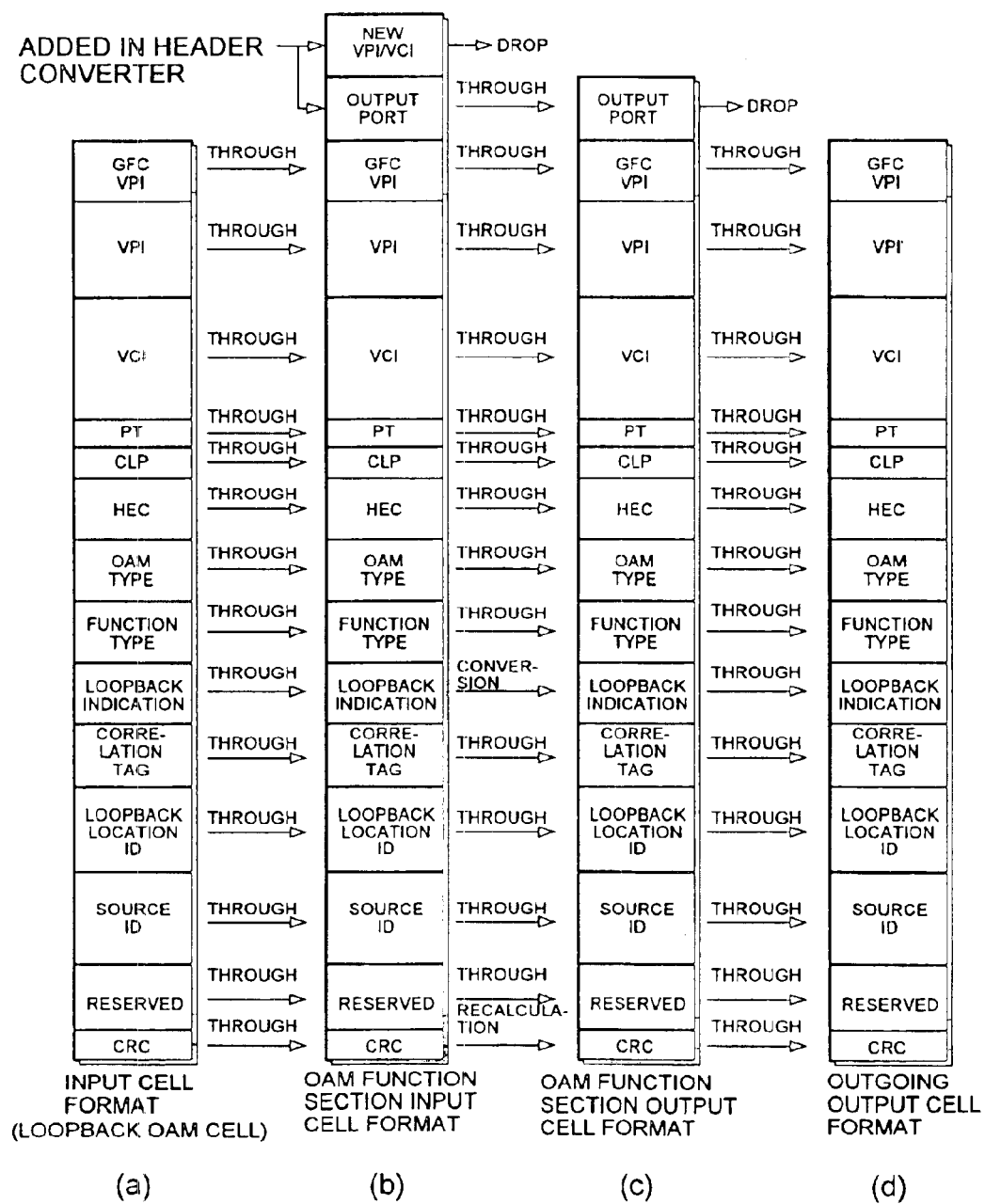
FIG. 12 is a diagram schematically showing data conversion conducted when returning a received LB cell in the present embodiment.

FIG. 12 schematically shows data conversion conducted when a received LB cell is returned, wherein (a) shows a format of a received LB cell, (b) shows a format of a cell inputted to the OAM function section $65_1$, (c) shows a format of a cell sent out on an outgoing line, and (d) shows a format of a cell sent out on an outgoing line. In the header converter $64_1$, a new VPI/VCI corresponding to the connection and an switch output port number are added to an LB cell having the format configuration (see FIG. 22) as shown in (b) of FIG. 12.

Thereafter, in the OAM discrimination section $80_1$ of the OAM function section $65_1$, the LB cell is outputted to the OAM cell data converter $81_1$. The OAM cell data converter $81_1$ rewrites the switch output port number added to the LB cell so as to indicate its own port number as described above, replaces "00000001" which indicates "forward" in the LB indication with "00000000" which indicates "return", recalculates CRC, and outputs the LB cell with the new VPI/VCI dropped as shown in (c) of FIG. 12. The LB cell is queued in the incoming cell buffer section $66_1$, and then switched in the ATM switch core 60 to its own switch port which is the corresponding output switch port. At that time, there is outputted an LB cell having such a format that the switch output port number is dropped as shown in (d) of FIG. 12.

OAM Flow

An OAM flow in the above-described hierarchical ATM layers will now be described hereinafter.

Figure 13:
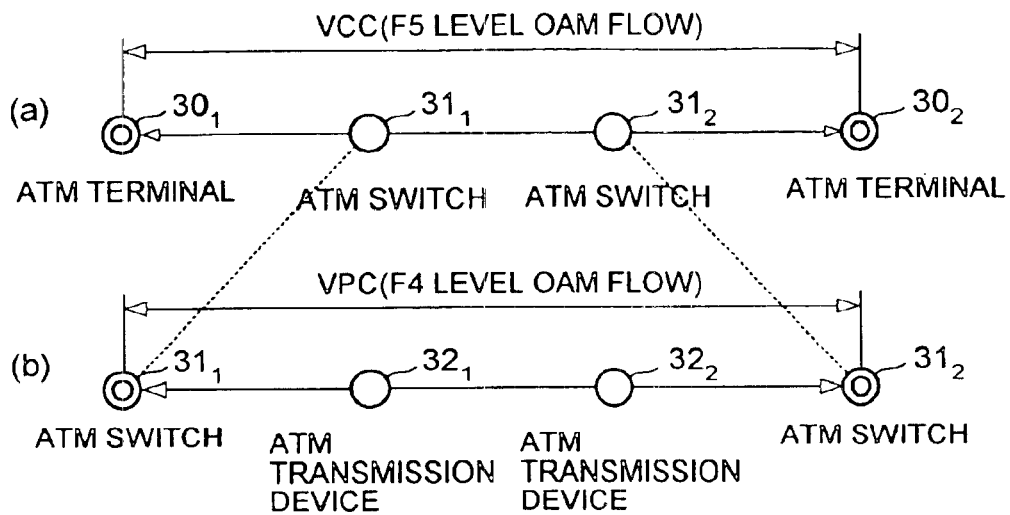
FIG. 13 is a diagram showing an outline of an OAM flow of each level of the ATM layer.
Figure 23:
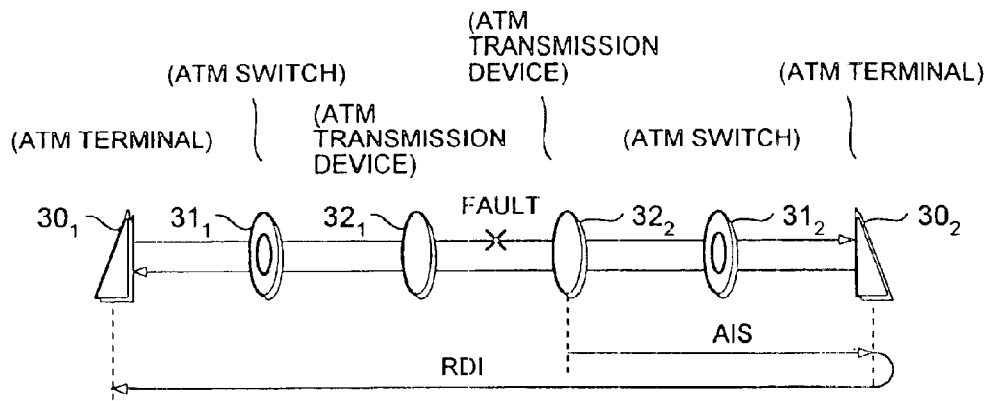
FIG. 23 is a diagram showing fault notice operation using an AIS cell and an RDI cell.
Figure 24:
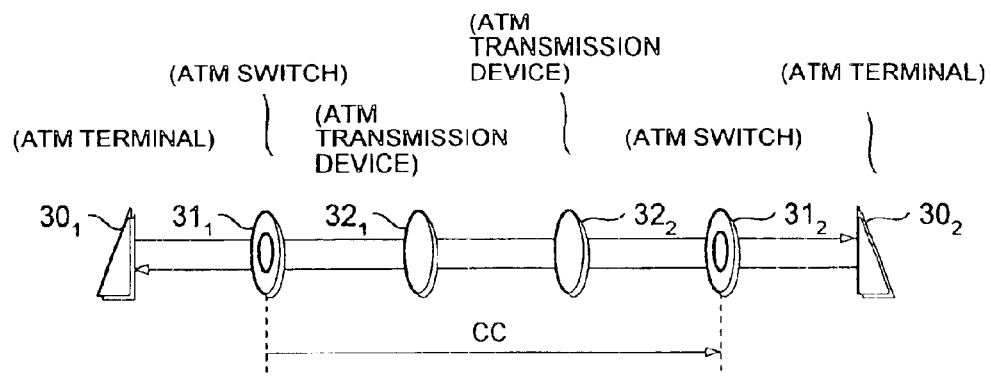
FIG. 24 is a diagram showing conduction test operation using a CC cell.
Figure 25:
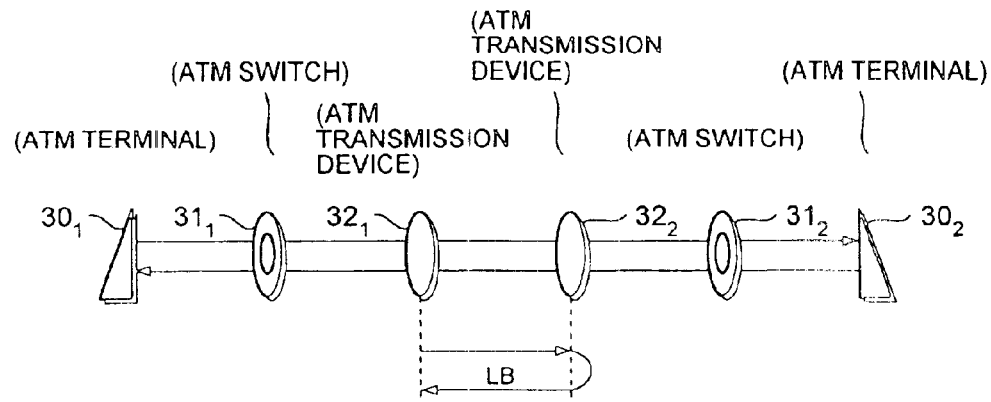
FIG. 25 is a diagram showing loopback test operation using an LB cell.

FIG. 13 schematically shows an OAM flow at each level in the ATM layers, wherein (a) shows an OAM flow of the VCC level which is the F5 level and (b) shows an OAM flow of the VPC level which is the F4 level. Here, taking as an example a connection in an ATM network having the configuration as shown in FIG. 23, the details will be described.

The OAM flow of the F5 level is a flow of the VCC level between the first and second ATM terminals $30_1$ and $30_2$. On the other hand, the OAM flow of the F4 level is a flow of the VPC level between the first and second ATM terminals $30_1$ and $30_2$.

When a fault is detected in the OAM flow of the F4 level, therefore, an AIS cell of the F4 level is transferred from the fault detected location into the downstream direction which is the forward direction. When the AIS cell has arrived at a network element set as an F4 end point at the time of connection setting, an RDI cell generated as shown in FIG. 11 is sent out in the upstream direction which is the backward direction. In addition, an AIS cell of the F5 level is sent out in the downstream direction which is the forward direction.

Figure 14:
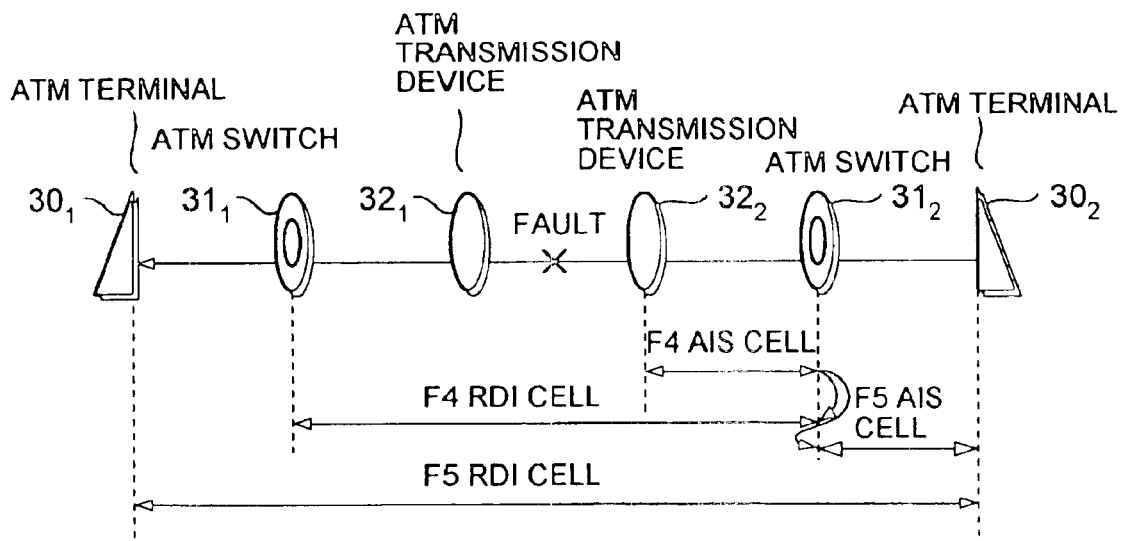
FIG. 14 is a diagram schematically showing an outline of operation of hierarchical OAM processing.

FIG. 14 schematically shows an outline of operation of the hierarchized OAM processing. When a fault has occurred in a path from the first ATM transmission device $32_1$ to the second ATM transmission device $32_2$, the fault is detected by the second ATM transmission device $32_2$ and an AIS cell of the F4 level is sent toward the second ATM switch $31_2$. In the case where the second ATM switch $31_2$ is previously set as an end point of the F4 level, the second ATM switch $31_2$ rewrites the function type of the received AIS cell of the F4 level to generate an RDI cell of the F4 level, and sends the RDI cell toward the first ATM switch $31_1$ located on the upstream side.

At the same time, the second ATM switch $31_2$ sets an AIS flag in the OAM table. The second ATM switch $31_2$ detects the AIS flag of the OAM table at predetermined intervals, and transfers an AIS cell of the F5 level of the corresponding connection to the downstream side. The second ATM terminal $30_2$ in which an end point of the F5 level rewrites the function type, generates an RDI cell of the F5 level, and sends the RDI cell toward the first ATM terminal $30_1$ located on the upstream side thereof.

OAM Processing

Figure 15:
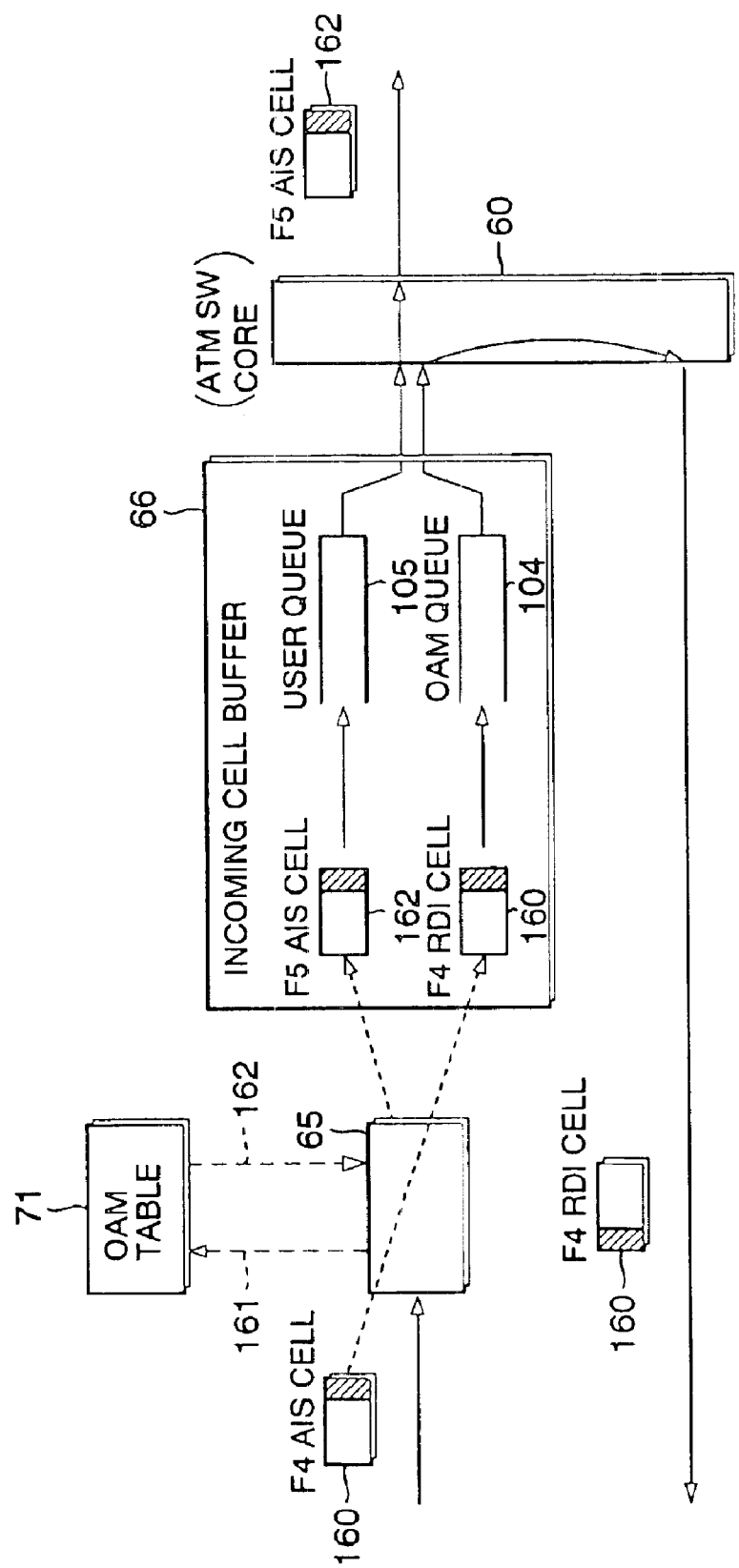
FIG. 15 is a diagram schematically showing an outline of operation conducted when receiving an AIS cell of F4 level at an end point point of F4 level in the present embodiment.

Hereafter, OAM processing prescribed in the ITU-T recommendation I.610, which is performed by the ATM switch according to the present embodiment will be described, FIG. 15 schematically shows an outline of operation conducted in the end point of the F4 level when an AIS cell of the F4 level is received. If it is determined by referring to the header conversion table in the header converter based on an AIS cell 160 of the F4 level that the present switch is set to an end point of the F4 level, then the OAM function section 65 rewrites the switch output port number into its own port, rewrites the function type of the AIS cell of the F4 level so as to indicate the RDI cell of the F4 level, and outputs the RDI cell to the incoming cell buffer section 66 without conducting header conversion. In the incoming cell buffer section 66, the RDI cell is stored in the OAM queue 104 and is switched by the ATM switch core 60 in accordance with the switch output port number to an outgoing line of its own port to return.

On the other hand, in order to transfer an AIS cell of the F5 level to the downstream side, an AIS flag of the OAM table 71 corresponding to a VCC having the VPC as a subordinate is set (flag set 161). A flag is periodically read out from the OAM table 71. When the flag is in the set state, an AIS cell of the F5 level for the corresponding VPC/VCC is sent out (sending out 162). The AIS cell 162 of the F5 level is temporarily stored in the user queue 105, and thereafter switched to a port of the downstream side by the ATM switch core 60.

Figure 16:
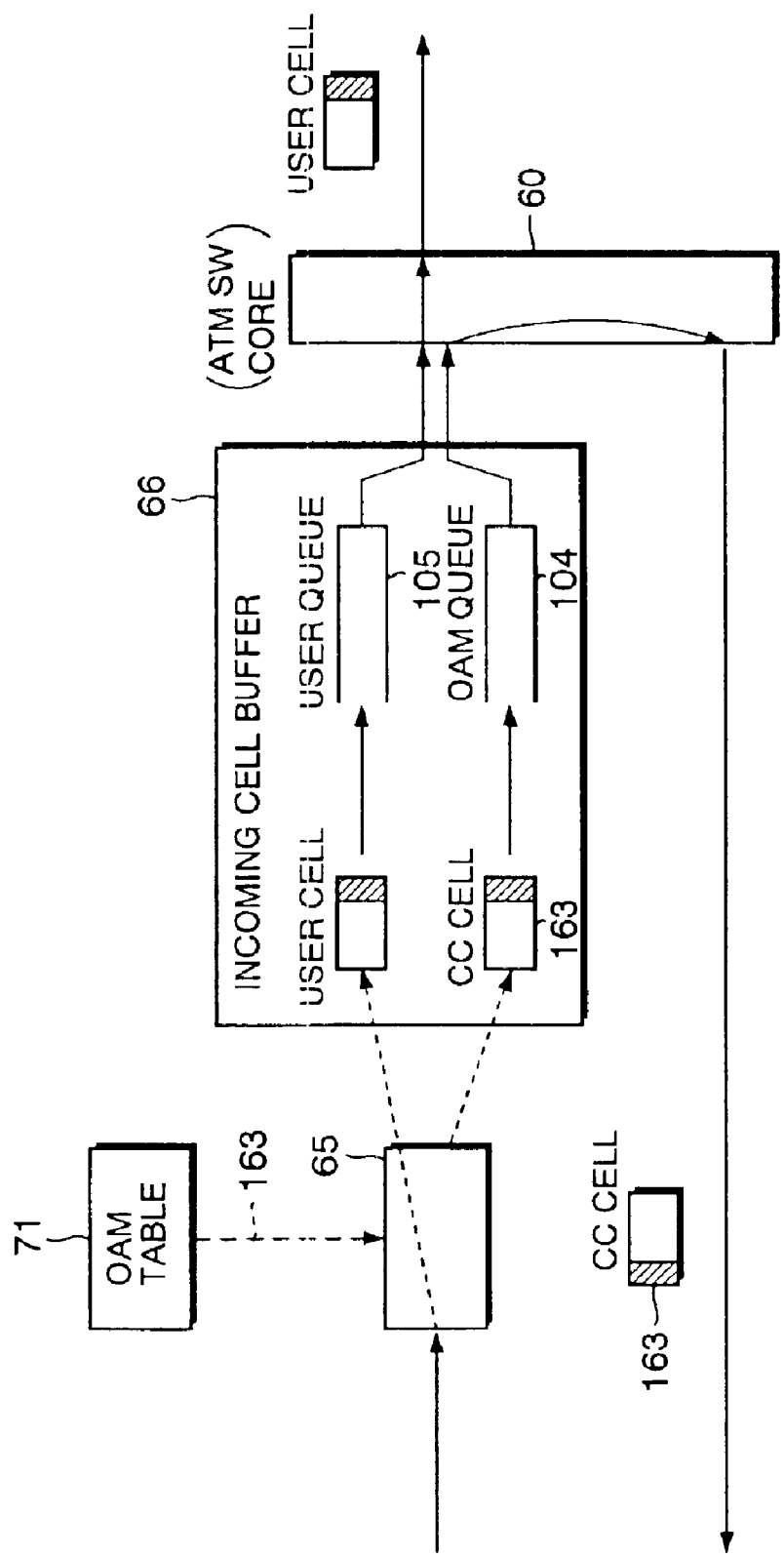
FIG. 16 is a diagram schematically showing an outline of CC cell generation and transfer at an end point of each OAM flow in the present embodiment.

FIG. 16 schematically shows an outline of the operation of generating and sending a CC cell at an end point of each OAM flow. The OAM generation section of the OAM function section 65 is designed to be capable of generating CC cells for all connections registered in the OAM table respectively at fixed period intervals (CC cell generation 163). The generated CC cell 163 has a switch output port number as its own port number. After the own port number is stored in the OAM queue 104, the generated CC cell 163 is switched by the ATM switch core 60 in accordance with the switch output port number to an outgoing line of its own port to return. In other words, the reception side of the OAM flow sends the CC cell back to the transmission side of the OAM flow.

Figure 17:
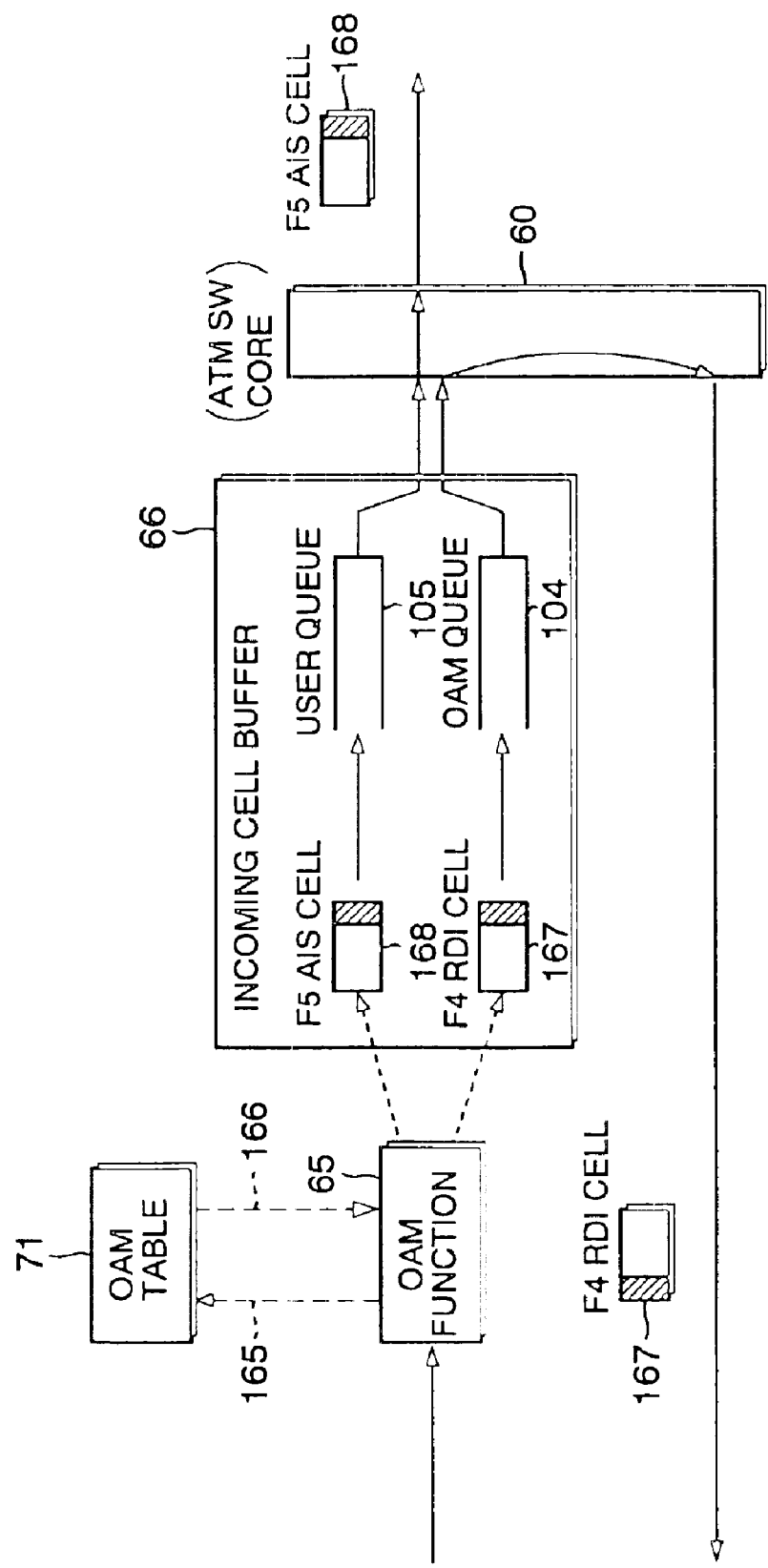
FIG. 17 is a diagram schematically showing an out line of operation of sending an AIS cell and an RDI cell when a CC cell or a user cell is not yet received at an end point of F4 level in the present embodiment.

FIG. 17 schematically shows an outline of operation of sending an AIS cell and an RDI cell when a CC cell or a user cell is not yet received in an end point of the F4 level. In the ATM switch according to the present embodiment, it is designed to be determined that a fault has occurred when a CC cell is not received at an end point of the OAM flow at regular intervals or when a user cell is not received at an end point of the OAM flow. If the reception timeout of a CC cell or a user cell is detected in the OAM function section 65 (time out detection 165), an RDI cell of the F4 level and an AIS cell of the F4 level are generated by referring to the OAM table 71 (cell generation 166). In the RDI cell 167 of the F4 level, the switch output port number is rewritten so as to indicate its own port. The RDI cell is temporarily stored in the OAM queue 104 and is switched by the ATM switch core 60 in accordance with the switch output port number to an outgoing line of its own port, and is sent to the upstream side of the connection. The AIS cell of the F5 level is temporarily stored in the user queue 105, and is sent out to the downstream side of the connection.

Figure 18:
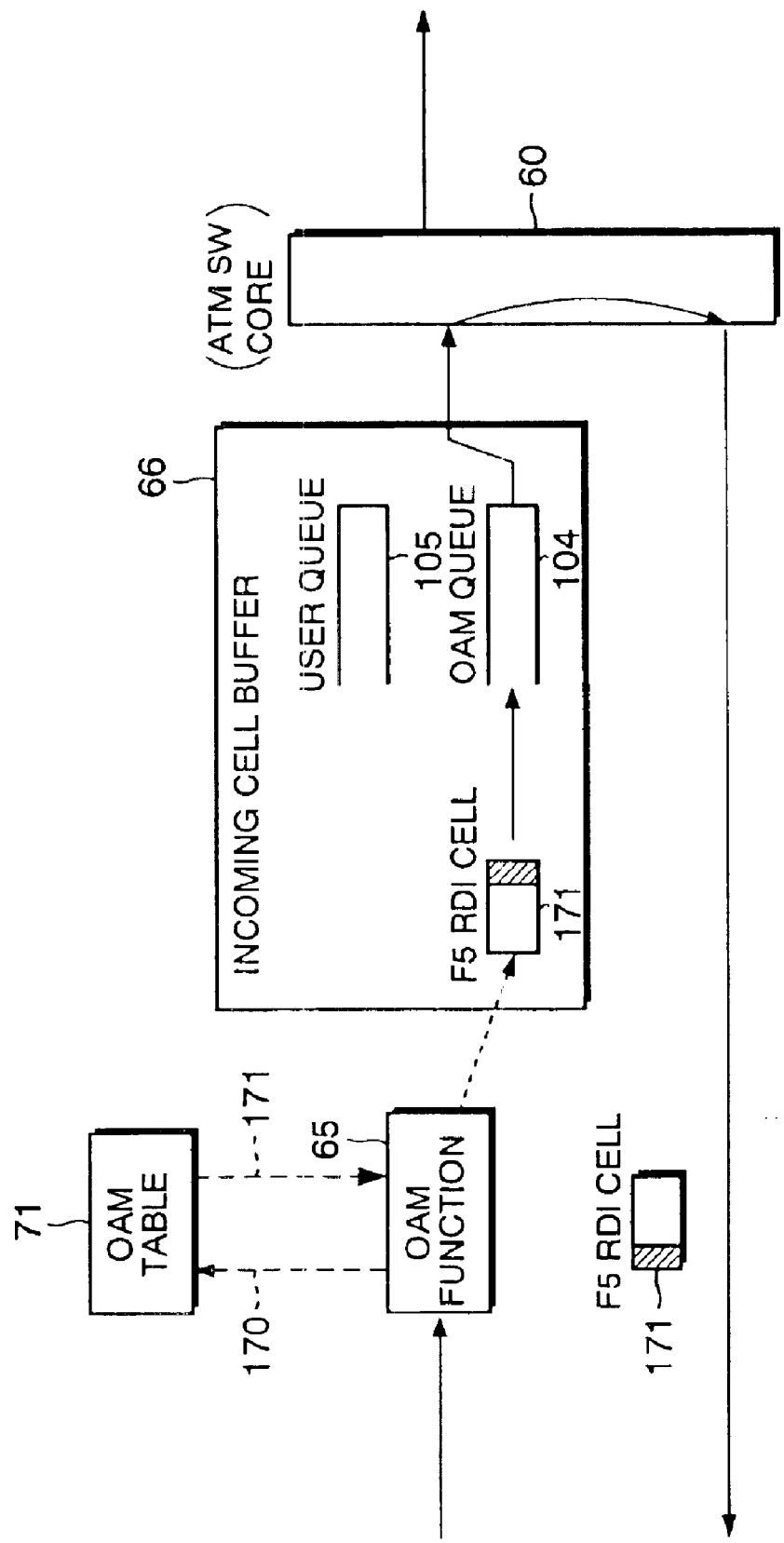
FIG. 18 is a diagram schematically showing an outline of operation of transferring an AIS cell and an RDI cell when a CC cell or a user cell is not yet received at an end point of F5 level in the present embodiment.

FIG. 18 schematically shows an outline of operation of sending an AIS cell and an RDI cell when a CC cell or a user cell is not yet received at an end point of the F5 level. In the ATM switch in the present embodiment, it is designed to be determined that a fault has occurred when a CC cell is not received at an end point of the OAM flow at regular intervals, or when a user cell is not received at an end point of the OAM flow. If the reception timeout of a CC cell or a user cell is detected in the OAM function section 65 (time out detection 170), an RDI cell of the F5 level is generated by referring to the OAM table 71 (cell generation 171). In the RDI cell 171 of the F5 level, the switch output port number is rewritten so as to indicate its own port. The RDI cell is temporarily stored in the OAM queue 104 and is switched by the ATM switch core 60 in accordance with the switch output port number to an outgoing line of its own port, and is sent out to the upstream side of the connection.

Figure 19:
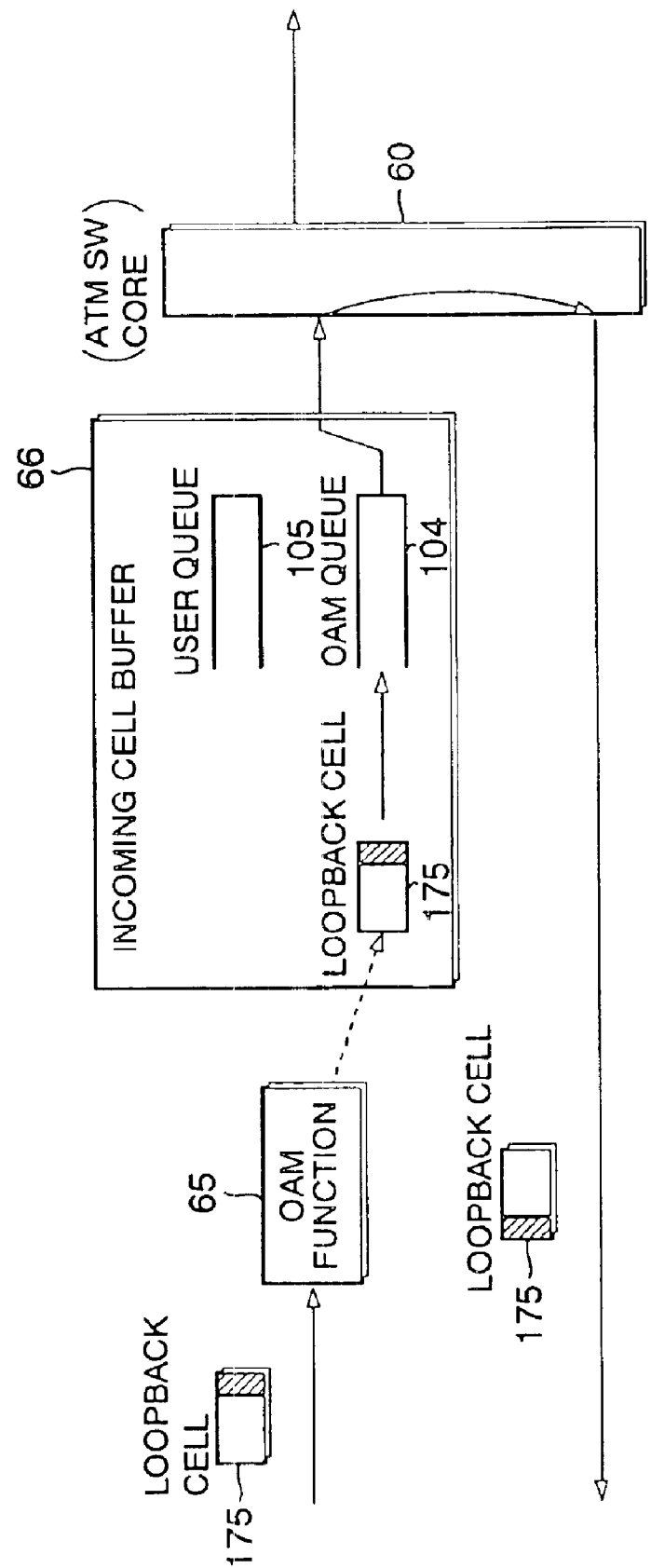
FIG. 19 is a diagram schematically showing an outline of operation of receiving an LB cell and loopback sending thereof when it is set as an LB location in the present embodiment.

FIG. 19 schematically shows an outline of operation of receiving an LB cell and returning it in a loopback manner when the switch is set for LB location. When the OMA function section 65 receives an LB cell 175, the OAM cell data converter rewrites the loopback indication field so as to change "00000001" to "00000000", rewrites the switch output port number to indicate its own port, and outputs the cell to the incoming cell buffer section 66 without converting the ATM cell header portion. In the incoming cell buffer section 66, the LB cell is temporarily stored in the OAM queue and is switched to its own port by the ATM switch core 60 in accordance with switch output port number, and then is sent out to the upstream side of the connection.

Thus, in the ATM switch according to the present embodiment, there are provided a header conversion table for storing information indicating whether the switch is set to an end point of the OAM processing flow for each connection, and an OAM table for storing an AIS flag and an RDI flag for each connection. As for an OAM cell which is forced to go back to its own port by referring to these tables, a switch output port number is rewritten by the OAM cell data converter. In addition, in the case of an AIS cell, the function type is rewritten so that it becomes an RDI cell. In the case of an LB cell, the LB indication is rewritten so that it is changed to "00000000" indicating the return and switching to its own port is conducted by the ATM switch core.

As a result, it becomes possible to conduct OAM processing such as return of an RDI cell upon reception of an AIS cell, and transmission and reception of an LB cell and a CC cell upon reception of an LB cell prescribed in ITU-T recommendation I.610, only on the reception side. It is only necessary to pull in only signal lines of the reception side into the ASIC or the like. Therefore, it becomes possible to reduce the cost of the ASIC and the ATM switch.

Furthermore, even in the case where OAM processing of a bidirectional connection is to be conducted, processing in each OAM flow can be executed only on the reception side. Accordingly, the amount of processing by software can be greatly reduced. In addition, it is necessary only to rewrite some fields and return a cell as it is via the switch. Therefore, it is not necessary to wait vacancy of user cells unlike the conventional technique. It is thus possible to greatly reduce the waiting time of an OAM cell to be generated and sent out, and increase the speed of the OAM processing.

In addition, by providing a shaper which performs shaping of the OAM queue for an OAM cell which should go back to its own port, it is possible to send OAM cells effectively while suppressing the influence upon the QoS of the user cells to the minimum. Furthermore, as to the arbitration between an output request from the user queue and an output request from the OAM queue, priority is given to the output request from the OAM queue. As a result, such a situation that the OAM cell cannot be outputted due to other user cells can be avoided.

According to the first aspect of the present invention, it becomes possible to conduct OAM processing only on the reception side. It is only necessary to pull in only signal lines of the reception side into the ASIC or the like. Therefore, it becomes possible to reduce the cost of the ASIC and the ATM switch.

According to the second aspect of the present invention, there is obtained the following effect in addition to the effect of the first aspect of the present invention. Even in the case where OAM processing of one bidirectional connection is to be conducted, processing in each OAM flow can be executed only on the reception side. Accordingly, processing of software can be greatly reduced. In addition, it is necessary only to rewrite some fields and return a cell intact via the switch. Therefore, it is not necessary to wait vacancy of user cells unlike the conventional technique. It is thus possible to greatly reduce the waiting time of an OAM cell to be generated and sent out, and increase the speed of the OAM processing.

According to the third aspect of the present invention, as to the RDI cell and the CC cell or the return loopback cell prescribed in ITU-T recommendation I.610, the OAM processing can be conducted on the reception side alone without providing the line transmission side with OAM processing function.

According to the fourth aspect of the present invention, header information of a cell which cannot be discriminated by the OAM cell discrimination means and the second OAM discrimination means is replaced with first connection information added by the header conversion means. A resultant cell is sent to the ATM switch means. Without greatly altering an ordinary ATM switch main body, therefore, a fault management function in the OAM processing can be implemented easily.

According to the fifth aspect of the present invention, an AIS flag of the OAM table is set, when a cell discriminated by the OAM discrimination means is an AIS cell of F4 level which is a virtual path connection level, and the cell is an end point of the OAM flow. At this time, an AIS cell of F5 level with respect to a virtual channel connection which is a subordinate of the virtual path connection is sent to the downstream side. It is possible to take an optimum measure such as an alternate path or reconnection at the time of occurrence of a fault A highly reliable ATM network can be constructed.

According to the sixth aspect of the present invention, a shaper is provided for an OAM queue for queuing an OAM cell which should go back to its own port. As a result, an OAM cell can be sent effectively while suppressing the influence upon the QoS of user cells to the minimum.

According to the seventh aspect of the present invention, priority is given to an output request from an OAM queue in arbitration between the output request from the OAM queue and an output request from a user queue. As a result, such a situation that an OAM cell cannot be outputted due to other user cells can be avoided.

Functions in ITU-T I.610

Referring to FIG. 20, in the fault management function, there are prescribed "alarm indication signal" (hereafter abbreviated to AIS) having a forward fault notice function, "remote defect indication" (hereafter abbreviated to RDI) having a backward fault notice function, "continuity check" (hereafter abbreviated to CC) having a periodic fault detection function, and "loopback" (hereafter abbreviated to LB) having a fault detection function in a measurement section.

AIS/RDI Cell Format

FIG. 21 shows a format configuration of an AIS cell or an RDI cell. The AIS cell or the RDI cell includes an ATM cell header 10 having 5 bytes and an OAM cell information field 11 having 48 bytes. The ATM cell header 10 includes "generic flow control" (hereafter abbreviated to GFC) for effecting output control, "virtual path identifier" (hereafter abbreviated to VPI) for identifying a virtual path, "virtual channel identifier" (hereafter abbreviated to VCI) for identifying a virtual identifier, "payload type" (hereafter abbreviated to VPI) for identifying a kind of data of the OAM cell information field 11, "cell loss priority" (hereafter abbreviated to CLP) for indicating priority of the cell loss, and "header error control" (hereafter abbreviated to HEC) for conducting error detection and correction of the header. The GFC exists in the case of a user network interface (UNI). In the case of a network node interface (NNI), the area of the GFC becomes the area of the VPI.

The OAM cell information field 11 includes "OAM type" 12, "function type" 13, "function specific field" 14, and "cyclic redundancy check" (hereafter abbreviated to CRC) 15. In the OAM type 12, a code "0001" for indicating that the cell is a fault management function cell is set as shown in FIG. 20. In the function type 13, a code "0000" is set in the case of an AIS cell and a code "0001" is set in the case of an RDI cell. The function specific field 14 includes "defect type" 16 for indicating the kind of a defect which has occurred, and "defect location" 17 for determining the occurrence location of the defect.

Loopback Cell Format

FIG. 22 shows a format configuration of an LB cell. In the same way, the LB cell also includes an ATM cell header 20 having 5 bytes and an OAM cell information field 21 having 48 bytes. The ATM cell header 20 includes the GFC, VPI, VCI, PT, CLP and HEC.

The OAM cell information field 21 includes "OAM type" 22, "function type" 23, "function specific field" 24, and "CRC" 25. In the OAM type 12, a code "0001" is set as shown in FIG. 20. In the function type 23, a code "1000" is set. The function specific field 24 includes "loopback indication" 26 for indicating "forward" or "return" of loopback, "correlation tag" 27, "loopback location ID" 28 for indicating a location where loopback should be effected, and source location ID 29 for indicating an occurrence location of an LB cell.

What is claimed is:

1. A system comprising:
    an ATM (asynchronous transfer mode) switch having a plurality of pairs of input and output ports each having different port numbers assigned thereto, wherein an ATM cell arriving at an input port is transferred to an output port depending on internal header information added to the ATM cell;
    an incoming line circuit connected to each of a plurality of input ports of the ATM switch; and
    an outgoing line circuit connected to each of a plurality of output ports of the ATM switch
    wherein the incoming line circuit comprises:
    a cell discriminator for discriminating a first OAM (operation, administration, and maintenance) cell requiring a response among ATM cells received from a corresponding incoming line;
    a cell data converter for converting the first OAM cell to a second OAM cell with internal header information indicating an output port of the ATM switch corresponding to the corresponding incoming line so that the second OAM cell is transferred to the output port corresponding to the corresponding incoming line to be sent through a corresponding outgoing line circuit;
    a header conversion table including an output port number and connection information for each of possible connections identified by header information of incoming ATM cells and further containing endpoint information indicating whether the system is an endpoint of an OAM flow for each level in ATM layer for each of the possible connections; and
    a header converter for converting an incoming ATM cell by searching the header conversion table for an output port number and connection information according to header information of the incoming ATM cell to add the output port number and connection information to the header information of the incoming ATM cell,
    wherein
    the cell discriminator discriminates an AIS (Alarm Indication Signal) cell having a connection relative to endpoint information indicating that the system is an endpoint of an OAM flow for each level in ATM layer and further discriminates a loopback cell when the system is set to a loopback point, and
    the cell data converter converts the AIS cell to an RDI (Remote Defect Indication) cell and further converts the loopback cell to a return loopback cell.

2. The system according to claim 1, wherein the cell discriminator further discriminates an RDI cell having a connection relative to endpoint information indicating that the system is an endpoint of an OAM flow for each level in ATM layer, a CC (Continuity Check) cell, and a return loopback cell that is a response to a loopback cell transmitted by the system,
    wherein the system further comprises:
    a terminator for terminating the RDI cell, the CC cell and the return loopback cell that are discriminated by the cell discriminator.

3. The system according to claim 2, wherein the incoming line circuit further comprises:
    an OAM table including an AIS flag for instructing AIS cell transmission and an RDI flag for instructing RDI cell transmission, and OAM cell setting information for each of the possible connections;
    a flag monitor for monitoring the AIS and RDI flags of the OAM table at regular intervals to determine whether a set one among the AIS and RDI flags exists; and
    an OAM cell transmission controller controlling such that
    when an AIS flag for a connection is set, an AIS cell is produced based on the OAM cell setting information for the connection and is transferred to the ATM switch, and
    when an RDI flag for a connection is set, an RDI cell with an output port number associated with an input port corresponding to the incoming line circuit is produced based on the OAM cell setting information for the connection and is transferred to the ATM switch.

4. The system according to claim 3, wherein an ATM cell which is not discriminated by the cell discriminator is converted such that header information thereof is changed to the connection information added by the header converter and is transferred to the ATM switch.

5. The system according to claim 3, wherein the incoming line circuit further comprises:
    an OAM table controller controlling such that, when an AIS cell having a connection relative to endpoint information indicating that the system is an endpoint of an OAM flow for a level of virtual path connection (VPC) has been received, an AIS flag instructing an AIS cell relative to a level of virtual channel connection (VCC) subordinate to the VPC to be transferred is set in the OAM table.

6. The system according to claim 1, wherein the incoming line circuit further comprises:
    a first queue for queuing first cells having internal header information indicating an output port of the ATM switch corresponding to the corresponding incoming line;
    a second queue for queuing second cells other than the first cells; and
    a shaper for shaping transfer of the first cells from the first queue to the ATM switch so as to ensure communication quality of the second cells queued in the second queue.

7. The system according to claim 6, wherein the incoming line circuit further comprises:

an output controller controlling such that higher priority is given to transfer of the first cells over that of the second cells.

8. A method for controlling OAM (operation, administration, and maintenance) processing in a system including an ATM (asynchronous transfer mode) switch having a plurality of pairs of input and output ports each having different port numbers assigned thereto, wherein an ATM cell arriving at an input port is transferred to an output port depending on internal header information added to the ATM cell, wherein an incoming line circuit connected to each of a plurality of input ports of the ATM switch, and an outgoing line circuit connected to each of a plurality of output ports of the ATM switch, the method comprising the steps of: at an incoming line circuit, a) discriminating a first OAM cell requiring a response among ATM cells received from a corresponding incoming line;

b) converting the first OAM cell to a second OAM cell with internal header information indicating an output port of the ATM switch corresponding to the corresponding incoming line so that the second OAM cell is transferred to the output port corresponding to the corresponding incoming line c) storing an output port number and connection information for each of possible connections identified by header information of incoming ATM cells and further containing endpoint information indicating whether the system is an endpoint of an OAM flow for each level in ATM layer for each of the possible connections; and d) converting an incoming ATM cell by searching the header conversion table for an output port number and connection information according to header information of the incoming ATM cell to add the output port number and connection information to the header information of the incoming ATM cell, wherein the step (a) discriminates an AIS (Alarm Indication Signal) cell having a connection relative to endpoint information indicating that the system is an endpoint of an OAM flow for each level in ATM layer and further discriminates a loopback cell when the system is set to a loopback point, and the step (b) converts the AIS cell to an RDI (Remote Defect Indication) cell and further converts the loopback cell to a return loopback cell.

9. The method according to claim 8, wherein the step (a) further discriminates an RDI cell having a connection relative to endpoint information indicating that the system is an endpoint of an OAM flow for each level in ATM layer, a CC (Continuity Check) cell, and a return loopback cell that is a response to a loopback cell transmitted by the system, the method further comprises the step of:

terminating the RDI cell, the CC cell and the return loopback cell that are discriminated by a cell discriminator.

10. The method according to claim 9, further comprises the steps of:

at the incoming line circuit, storing an AIS flag for instructing AIS cell transmission and an RDI flag for instructing RDI cell transmission, and OAM cell setting information for each of the possible connections;

monitoring the AIS and RDI flags of an OAM table at regular intervals to determine whether a set one among the AIS and RDI flags exists;

when an AIS flag for a connection is set, producing an AIS cell based on the OAM cell setting information for the connection and is transferred to the ATM switch; and when an RDI flag for a connection is set, producing an RDI cell with an output port number associated with an input port corresponding to the incoming line circuit based on the OAM cell setting information for the connection and is transferred to the ATM switch.

11. The method according to claim 9, wherein an ATM cell which is not discriminated by the cell discriminator is converted such that header information thereof is changed to the connection information added and is transferred to the ATM switch.

12. The method according to claim 9, further comprises the step of:

when an AIS cell having a connection relative to endpoint information indicating that the system is an endpoint of an OAM flow for a level of virtual path connection (VPC) has been received, setting an AIS flag instructing an AIS cell relative to a level of virtual channel connection (VCC) subordinate to the VPC to be transferred in an OAM table.

* * * * *